US008837828B2

(12) United States Patent
Kang

(10) Patent No.: US 8,837,828 B2
(45) Date of Patent: *Sep. 16, 2014

(54) CIE LAB COLOR SPACE BASED COLOR CONVERSION METHOD AND DEVICE AND LIQUID CRYSTAL DISPLAY DEVICE

(75) Inventor: Chih-tsung Kang, Guandong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 125 days.

This patent is subject to a terminal disclaimer.

(21) Appl. No.: 13/575,302

(22) PCT Filed: Apr. 17, 2012

(86) PCT No.: PCT/CN2012/074154
§ 371 (c)(1),
(2), (4) Date: Jul. 26, 2012

(87) PCT Pub. No.: WO2013/143187
PCT Pub. Date: Oct. 3, 2013

(65) Prior Publication Data
US 2013/0249956 A1  Sep. 26, 2013

(30) Foreign Application Priority Data
Mar. 26, 2012  (CN) .......................... 2012 1 0082948

(51) Int. Cl.
*G06K 9/00*  (2006.01)

(52) U.S. Cl.
USPC .......................................................... 382/167

(58) Field of Classification Search
CPC ............. G06T 7/408; H04N 1/56; H04N 1/60
USPC .................................... 382/162, 167; 358/1.9
See application file for complete search history.

(56) References Cited

U.S. PATENT DOCUMENTS

| 5,692,071 A * | 11/1997 | Govaert ......................... 382/167 |
| 7,231,084 B2 * | 6/2007 | Tang et al. ..................... 382/162 |
| 7,586,642 B2 * | 9/2009 | Chiba ............................ 358/1.9 |
| 7,983,479 B2 * | 7/2011 | Suzuki et al. ................. 382/162 |

* cited by examiner

*Primary Examiner* — Samir Ahmed
(74) *Attorney, Agent, or Firm* — Andrew C. Cheng

(57) ABSTRACT

The present invention provides a CIE Lab color space based color conversion method, which includes converting two-dimensional color planes Ln and Ln-1 of original diagram data into two-dimensional color planes Ln' and Ln-1'; according to a plane Lx of any lightness level between the known Ln and Ln-1, calculating Lx' between Ln' and Ln-1' and having the same lightness level as Lx; calculating a conversion matrix between Lx and Lx'; calculating color-converted and adjusted target color according to the color of any one point of the original diagram data; and completing color space of the target color. The present invention also provides a CIE Lab color space based color conversion device and a liquid crystal display device. With the above method, the present invention allows of easy construction of reverse conversion model. The algorithm can be easily implemented and the operation speed is increased.

10 Claims, 5 Drawing Sheets

S101: inputting original diagram data based on CIE Lab three-dimensional color space S102: equally dividing the space in which all the colors corresponding to the original diagram data are located into n two-dimensional color planes of the color space according to lightness so as to form n two-dimensional color planes L1, L2, L3, ..., Ln-1, and Ln, where n is a nature number S103: determining specific most saturated points An, Bn, Cn, Dn, ... of the original diagram data on an outer perimeter of the two-dimensional color plane Ln and determining specific most saturated points An', Bn', Cn', Dn', ... on an outer perimeter of the target two-dimensional color plane Ln' that is of the same lightness level as the two-dimensional color plane Ln of the original diagram data, wherein the specific most saturated points An', Bn', Cn', Dn', ... on the outer perimeter of the two-dimensional color plane Ln' and the specific most saturated points An, Bn, Cn, Dn, ... on the outer perimeter of the two-dimensional color plane Ln form a first one-to-one corresponding relationship S104: determining a first conversion matrix according to the first one-to-one corresponding relationship between the specific, most-saturated outer perimeter points An', Bn', Cn', Dn', ... of the two-dimensional color plane Ln' and the specific, most-saturated outer perimeter points An, Bn, Cn, Dn, ... of the two-dimensional color plane Ln and converting the two-dimensional color (a, b) of one of the specific, most-saturated outer perimeter points of the two-dimensional color plane Ln into two-dimensional (a', b') of the point of the target two-dimensional color plane Ln' corresponding to said one specific, most-saturated outer perimeter point according to the first conversion matrix S105: determining a second one-to-one corresponding relationship between specific most-saturated points An-1', Bn-1', Cn-1', Dn-1', ... on outer perimeter of a target two-dimensional color plane Ln-1' and specific most-saturated points of the original diagram data An-1, Bn-1, Cn-1, Dn-1, ... on outer perimeter of the two-dimensional color plane Ln-1 according to the first one-to-one corresponding relationship, determining a second conversion matrix according to the second one-to-one corresponding relationship, and converting the two-dimensional color (a, b) of one of the specific, most-saturated outer perimeter points of the two-dimensional color plane Ln-1 into the two-dimensional color (a', b') of the point of the target two-dimensional color plane Ln-1' that corresponds to said one specific, most-saturated outer perimeter point according to the second conversion matrix S106: calculating the two-dimensional color (a, b) of specific, most-saturated outer perimeter points $A_x$, $B_x$, $C_x$, $D_x$, ... of a two-dimensional color plane Lx having a lightness level between the two-dimensional color plane Ln and the two-dimensional color plane Ln-1 according to the two-dimensional color (a, b) of the specific, most-saturated outer perimeter points An, Bn, Cn, Dn, ... of the two-dimensional color plane Ln and the two-dimensional color (a, b) of the specific, most-saturated outer perimeter points An-1, Bn-1, Cn-1, Dn-1, ... of the two-dimensional color plane Ln-1, wherein $A_x=(a_{Ax}, b_{Ax})$, $B_x=(a_{Bx}, b_{Bx})$, $C_x=(a_{Cx}, b_{Cx})$, $D_x=(a_{Dx}, b_{Dx})$, ... and calculating the two-dimensional color (a', b') of specific, most-saturated outer perimeter points $A_x'$, $B_x'$, $C_x'$, $D_x'$, ... of a two-dimensional color plane Lx' having a lightness level between the two-dimensional color plane Ln' and the two-dimensional color plane Ln-1' according to the two-dimensional color (a', b') of the specific, most-saturated outer perimeter points An', Bn', Cn', Dn', ... of the two-dimensional color plane Ln' and the two-dimensional color (a', b') of the specific, most-saturated outer perimeter points An-1', Bn-1', Cn-1', Dn-1', ... of the two-dimensional color plane Ln-1', wherein $A_x'=(a_{Ax}', b_{Ax}')$, $B_x'=(a_{Bx}', b_{Bx}')$, $C_x'=(a_{Cx}', b_{Cx}')$, $D_x'=(a_{Dx}', b_{Dx}')$, ...

S107: determining a third conversion matrix between the two-dimensional color (a*, b*) of the two-dimensional color plane Lx and the target two-dimensional color (a*', b*') of the two-dimensional color plane Lx' according to the specific, most-saturated outer perimeter points $A_x'$, $B_x'$, $C_x'$, $D_x'$, ... of the two-dimensional color plane Lx' and the specific, most-saturated outer perimeter points $A_x$, $B_x$, $C_x$, $D_x$, ... of the two-dimensional color plane Lx S108: applying the third conversion matrix to calculate a color-converted and adjusted target color for the color of one point of the original diagram data on the two-dimensional color plane Lx S109: outputting or storing target diagram data corresponding to color-converted and adjusted target color

FIGURE 1

CIE LAB COLOR SPACE BASED COLOR CONVERSION METHOD AND DEVICE AND LIQUID CRYSTAL DISPLAY DEVICE

BACKGROUND OF THE INVENTION

1. Field of the Invention

The present invention relates to the field of color conversion, and in particular to a CIE Lab (Commission Internationale D'Eclairage) color space based color conversion method and device and a liquid crystal display device.

2. The Related Arts

Due to the nature of dispersion of a liquid crystal display device, together with the use of photoresist and light source, the expression of color of the liquid crystal display device often shows a great difference from the color visually perceived by human eyes.

Based on physics and photometry, an appropriate combination of the three primary colors can be used to describe all the colors available in the nature. A color notation system based on this theory is referred to as a color mixing system. The most important mixing color systems for color notation are the Commission Internationale d'Eclairage (CIE) systems, such as CIE XYZ, CIE Lab, CIE LUV, and CIE LCH.

Color conversion is a process of converting a color from one color space to another color space. There are many techniques to realize the color space conversion, such as model method and neural network algorithm, wherein the model method involves complicated computation process of solution finding and the conversion result is not always satisfactory, while the neural network algorithm approach requires a large amount of experiments, with each experiment requiring a long time. Furthermore, the above two approaches for color conversion also result in a large discrepancy between the LCD (Liquid Crystal Display) color performance and the true color of an object.

Thus, it is desired to develop a color conversion technique that makes the color performance of an LCD closer to, or even brighter and more vivid than, the true color of an object.

SUMMARY OF THE INVENTION

The technical issue to be addressed by the present invention is to provide a CIE Lab color space based color conversion method and device and a liquid crystal display device, which is easier to construct a reverse conversion model, and implement the conversion algorithm with fast computation so that the color performance can be closer to the true object color or closer to expected effect than the true object color.

To address the above technical issue, the present invention adopts a technical solution by providing a CIE Lab color space based color conversion method, which comprises: inputting original diagram data based on CIE Lab three-dimensional color space;

equally dividing the space in which all the colors corresponding to the original diagram data are located into n two-dimensional color planes of the color space according to lightness so as to form n two-dimensional color planes L1, L2, L3, . . . , Ln-1, and Ln, where n is a nature number;

determining specific most saturated points An, Bn, Cn, Dn, . . . of the original diagram data on an outer perimeter of the two-dimensional color plane Ln and determining specific most saturated points An', Bn', Cn', Dn', . . . on an outer perimeter of the target two-dimensional color plane Ln' that is of the same lightness level as the two-dimensional color plane Ln of the original diagram data, wherein the specific most saturated points An', Bn', Cn', Dn', . . . on the outer perimeter of the two-dimensional color plane Ln' and the specific most saturated points An, Bn, Cn, Dn, . . . on the outer perimeter of the two-dimensional color plane Ln form a first one-to-one corresponding relationship;

determining a first conversion matrix according to the first one-to-one corresponding relationship between the specific, most-saturated outer perimeter points An', Bn', Cn', Dn', . . . of the two-dimensional color plane Ln' and the specific, most-saturated outer perimeter points An, Bn, Cn, Dn, of the two-dimensional color plane Ln and converting the two-dimensional color (a, b) of one of the specific, most-saturated outer perimeter points of the two-dimensional color plane Ln into two-dimensional (a', b') of the point of the target two-dimensional color plane Ln' corresponding to said one specific, most-saturated outer perimeter point according to the first conversion matrix;

determining a second one-to-one corresponding relationship between specific most-saturated points An-1', Bn-1', Cn-1', Dn-1', . . . on outer perimeter of a target two-dimensional color plane Ln-1' and specific most-saturated points of the original diagram data An-1, Bn-1, Cn-1, Dn-1, on outer perimeter of the two-dimensional color plane Ln-1 according to the first one-to-one corresponding relationship, determining a second conversion matrix according to the second one-to-one corresponding relationship, and converting the two-dimensional color (a, b) of one of the specific, most-saturated outer perimeter points of the two-dimensional color plane Ln-1 into the two-dimensional color (a', b') of the point of the target two-dimensional color plane Ln-1' that corresponds to said one specific, most-saturated outer perimeter point according to the second conversion matrix;

calculating the two-dimensional color (a, b) of specific, most-saturated outer perimeter points Ax, Bx, Cx, Dx, . . . of a two-dimensional color plane Lx having a lightness level between the two-dimensional color plane Ln and the two-dimensional color plane Ln-1 according to the two-dimensional color (a, b) of the specific, most-saturated outer perimeter points An, Bn, Cn, Dn, . . . of the two-dimensional color plane Ln and the two-dimensional color (a, b) of the specific, most-saturated outer perimeter points An-1, Bn-1, Cn-1, Dn-1, . . . of the two-dimensional color plane Ln-1, wherein Ax=$(a_{Ax}, b_{Ax})$, Bx=$(a_{Bx}, b_{Bx})$, Cx=$(a_{Cx}, b_{Cx})$, Dx=$(a_{Dx}, b_{Dx})$, . . . and calculating the two-dimensional color (a', b') of specific, most-saturated outer perimeter points Ax', Bx', Cx', Dx', . . . of a two-dimensional color plane Lx' having a lightness level between the two-dimensional color plane Ln' and the two-dimensional color plane Ln-1' according to the two-dimensional color (a', b') of the specific, most-saturated outer perimeter points An', Bn', Cn', Dn', of the two-dimensional color plane Ln' and the two-dimensional color (a', b') of the specific, most-saturated outer perimeter points An-1', Bn-1', Cn-1', Dn-1', . . . of the two-dimensional color plane Ln-1', wherein Ax'=$(a_{Ax}', b_{Ax}')$, Bx'=$(a_{Bx}', b_{Bx}')$, Cx'=$(a_{Cx}', b_{Cx}')$, Dx'=$(a_{Dx}', b_{Dx}')$, . . . ;

determining a third conversion matrix between the two-dimensional color (a*, b*) of the two-dimensional color plane Lx and the target two-dimensional color (a*', b*') of the two-dimensional color plane Lx' according to the specific, most-saturated outer perimeter points Ax', Bx', Cx', Dx', . . . of the two-dimensional color plane Lx' and the specific, most-saturated outer perimeter points Ax, Bx, Cx, Dx, . . . of the two-dimensional color plane Lx;

applying the third conversion matrix to calculate a color-converted and adjusted target color for the color of one point of the original diagram data on the two-dimensional color plane Lx; and outputting or storing target diagram data corresponding to color-converted and adjusted target color.

Wherein, the first conversion matrix is:

$$\begin{bmatrix} a'_n \\ b'_n \end{bmatrix} =$$

$$\begin{bmatrix} a11 & a12 & a13 & a14 & a15 & a16 & a17 & a18 & a19 & a20 \\ a21 & a22 & a23 & a24 & a25 & a26 & a27 & a28 & a29 & a20 \end{bmatrix} \times \begin{bmatrix} a_n^3 \\ b_n^3 \\ a_n^2 b_n \\ a_n b_n^2 \\ a_n^2 \\ b_n^2 \\ a_n b_n \\ a_n \\ b_n \\ 1 \end{bmatrix}$$

Wherein, the second conversion matrix is:

$$\begin{bmatrix} a'_{n-1} \\ b'_{n-1} \end{bmatrix} =$$

$$\begin{bmatrix} a11 & a12 & a13 & a14 & a15 & a16 & a17 & a18 & a19 & a20 \\ a21 & a22 & a23 & a24 & a25 & a26 & a27 & a28 & a29 & a30 \end{bmatrix} \times \begin{bmatrix} a_{n-1}^3 \\ b_{n-1}^3 \\ a_{n-1}^2 b_{n-1} \\ a_{n-1} b_{n-1}^2 \\ a_{n-1}^2 \\ b_{n-1}^2 \\ a_{n-1} b_{n-1} \\ a_{n-1} \\ b_{n-1} \\ 1 \end{bmatrix}$$

Wherein, the step of calculating the two-dimensional color (a, b) of specific, most-saturated outer perimeter points Ax, Bx, Cx, Dx, . . . of a two-dimensional color plane Lx having a lightness level between the two-dimensional color plane Ln and the two-dimensional color plane Ln-1 according to the two-dimensional color (a, b) of the specific, most-saturated outer perimeter points An, Bn, Cn, Dn, . . . of the two-dimensional color plane Ln and the two-dimensional color (a, b) of the specific, most-saturated outer perimeter points An-1, Bn-1, Cn-1, Dn-1, . . . of the two-dimensional color plane Ln-1, wherein Ax=($a_{Ax}$, $b_{Ax}$), Bx=($a_{Bx}$, $b_{Bx}$), Cx=($a_{Cx}$, $b_{Cx}$), Dx=($a_{Dx}$, $b_{Dx}$), . . . , comprises carrying out the calculation according to first relationships between the specific, most-saturated outer perimeter points Ax, Bx, Cx, Dx, . . . of the two-dimensional color plane Lx having a lightness level between the two-dimensional color plane Ln and the two-dimensional color plane Ln-1 and the specific, most-saturated outer perimeter points An, Bn, Cn, Dn, . . . of the two-dimensional color plane Ln and the specific, most-saturated outer perimeter points An-1, Bn-1, Cn-1, Dn-1, . . . of the two-dimensional color plane Ln-1 in order to obtain the two-dimensional color (a, b) of the specific, most-saturated outer perimeter points Ax, Bx, Cx, Dx, . . . of the two-dimensional color plane Lx having a lightness level between the two-dimensional color plane Ln and the two-dimensional color plane Ln-1, wherein the first relationships are as follows:

$$a_x = a_n + (L_x - L_n)^* (a_{n-1} - a_n)/(L_{n-1} - L_n)$$

$$b_x = b_n + (L_x - L_n)^* (b_{n-1} - b_n)/(L_{n-1} - L_n)$$

Wherein, the step of calculating the two-dimensional color (a', b') of specific, most-saturated outer perimeter points Ax', Bx', Cx', Dx', . . . of a two-dimensional color plane Lx' between the two-dimensional color plane Ln' and the two-dimensional color plane Ln-1' and having the same lightness level as the two-dimensional color plane Lx according to the two-dimensional color (a', b') of the specific, most-saturated outer perimeter points An', Bn', Cn', Dn', . . . of the two-dimensional color plane Ln' and the two-dimensional color (a', b') of the specific, most-saturated outer perimeter points An-1', Cn-1', Dn-1', . . . of the two-dimensional color plane Ln-1', wherein Ax'=($a_{Ax}'$, $b_{Ax}'$), Bx'=($a_{Bx}'$, $b_{Bx}'$), Cx'=($a_{Cx}'$, $b_{Cx}'$), Dx'=($a_{Dx}'$, $b_{Dx}'$), . . . , comprises carrying out the calculation according to second relationships between the specific, most-saturated outer perimeter points Ax', Bx', Cx', Dx', . . . of the two-dimensional color plane Lx' and the specific, most-saturated outer perimeter points An', Bn', Cn', Dn', . . . of the two-dimensional color plane Ln' and the specific, most-saturated outer perimeter points An-1', Bn-1', Cn-1', Dn-1', . . . of the two-dimensional color plane Ln-1' in order to obtain the two-dimensional color (a', b') of the specific, most-saturated outer perimeter points Ax', Bx', Cx', Dx', . . . of the two-dimensional color plane Lx' between the two-dimensional color plane Ln' and the color planes Ln-1' and having the same lightness level as two-dimensional color plane Lx, wherein the second relationships are as follows:

$$a_x' = a_n' + (L_x - L_n)^* (a_{n-1}' - a_n')/(L_{n-1} - L_n)$$

$$b_x' = b_n' + (L_x - L_n)^* (b_{n-1}' - b_n')/(L_{n-1} - L_n)$$

Wherein, the third conversion matrix between the two-dimensional color (a*, b*) of the two-dimensional color plane Lx and the target two-dimensional color (a*', b*') of the two-dimensional color plane Lx' is:

$$\begin{bmatrix} a'_x \\ b'_x \end{bmatrix} =$$

$$\begin{bmatrix} a11 & a12 & a13 & a14 & a15 & a16 & a17 & a18 & a19 & a20 \\ a21 & a22 & a23 & a24 & a25 & a26 & a27 & a28 & a29 & a30 \end{bmatrix} \times \begin{bmatrix} a_x^3 \\ b_x^3 \\ a_x^2 b_x \\ a_x b_x^2 \\ a_x^2 \\ b_x^2 \\ a_x b_x \\ a_{x-1} \\ b_{x-1} \\ 1 \end{bmatrix}$$

Wherein, before the step of equally dividing the space in which all the colors corresponding to the original diagram data are located into n two-dimensional color planes of the color space, a step of determining the number n of the two-dimensional color planes that are formed by equally dividing, according to lightness, the space to which all the colors of the original diagram data corresponds on the basis of proportional relationship between preciseness of color conversion and the number of divisions made on the color space is further included.

Wherein, before the step of determining specific most saturated points An, Bn, Cn, Dn, . . . of the original diagram data on an outer perimeter of the two-dimensional color plane Ln and determining specific most saturated points An', Bn', Cn', Dn', . . . on an outer perimeter of the target two-dimensional color plane Ln' that is of the same lightness level as the two-dimensional color plane Ln of the original diagram data, a step of determining the number of the specific, most-saturated outer perimeter points of the two-dimensional color plane on the basis of proportional relationship between preciseness of color conversion and the number of the specific most-saturated outer perimeter points of the two-dimensional color plane is further included.

To address the above technical issue, the present invention adopts a technical solution by providing a CIE Lab color space based color conversion device. The device comprises:

an original data input module, which functions for inputting original diagram data based on CIE Lab three-dimensional color space;

a division module, which functions to equally divide the space in which all the colors corresponding to the original diagram data are located into n two-dimensional color planes of the color space according to lightness so as to form n two-dimensional color planes L1, L2, L3, . . . , Ln-1, and Ln, where n is a nature number;

a first corresponding relationship module, which functions to determine specific most saturated points An, Bn, Cn, Dn, . . . of the original diagram data on an outer perimeter of the two-dimensional color plane Ln and determining specific most saturated points An', Bn', Cn', Dn', . . . on an outer perimeter of the target two-dimensional color plane Ln' that is of the same lightness level as the two-dimensional color plane Ln of the original diagram data, wherein the specific most saturated points An', Bn', Cn', Dn', . . . on the outer perimeter of the two-dimensional color plane Ln' and the specific most saturated points An, Bn, Cn, Dn, . . . on the outer perimeter of the two-dimensional color plane Ln form a first one-to-one corresponding relationship;

a first conversion matrix module, which functions to determine a first conversion matrix according to the first one-to-one corresponding relationship between the specific, most-saturated outer perimeter points An', Bn', Cn', Dn', . . . of the two-dimensional color plane Ln' and the specific, most-saturated outer perimeter points An, Bn, Cn, Dn, of the two-dimensional color plane Ln and converting the two-dimensional color (a, b) of one of the specific, most-saturated outer perimeter points of the two-dimensional color plane Ln into two-dimensional (a', b') of the point of the target two-dimensional color plane Ln' corresponding to said one specific, most-saturated outer perimeter point according to the first conversion matrix;

a second corresponding relationship module, which functions to determine a second one-to-one corresponding relationship between specific most-saturated points An-1', Bn-1', Cn-1', Dn-1', . . . on outer perimeter of a target two-dimensional color plane Ln-1' and specific most-saturated points of the original diagram data An-1, Bn-1, Cn-1, Dn-1, . . . on outer perimeter of the two-dimensional color plane Ln-1 according to the first one-to-one corresponding relationship;

a second conversion matrix module, which functions to determine a second conversion matrix according to the second one-to-one corresponding relationship and convert the two-dimensional color (a, b) of one of the specific, most-saturated outer perimeter points of the two-dimensional color plane Ln-1 into the two-dimensional color (a', b') of the point of the target two-dimensional color plane Ln-1' that corresponds to said one specific, most-saturated outer perimeter point according to the second conversion matrix;

a calculation module, which functions to calculate the two-dimensional color (a, b) of specific, most-saturated outer perimeter points Ax, Bx, Cx, Dx, . . . of a two-dimensional color plane Lx having a lightness level between the two-dimensional color plane Ln and the two-dimensional color plane Ln-1 according to the two-dimensional color (a, b) of the specific, most-saturated outer perimeter points An, Bn, Cn, Dn, . . . of the two-dimensional color plane Ln and the two-dimensional color (a, b) of the specific, most-saturated outer perimeter points An-1, Bn-1, Cn-1, Dn-1, . . . of the two-dimensional color plane Ln-1, wherein Ax=($a_{Ax}$, $b_{Ax}$), Bx=($a_{Bx}$, $b_{Bx}$), Cx=($a_{Cx}$, $b_{Cx}$), Dx=($a_{Dx}$, $b_{Dx}$), . . . and calculate the two-dimensional color (a', b') of specific, most-saturated outer perimeter points Ax', Bx', Cx', Dx', . . . of a two-dimensional color plane Lx' having a lightness level between the two-dimensional color plane Ln' and the two-dimensional color plane Ln-1' according to the two-dimensional color (a', b') of the specific, most-saturated outer perimeter points An', Bn', Cn', Dn', . . . of the two-dimensional color plane Ln' and the two-dimensional color (a', b') of the specific, most-saturated outer perimeter points An-1', Bn-1', Cn-1', Dn-1', . . . of the two-dimensional color plane Ln-1', wherein Ax'=($a_{Ax}'$, $b_{Ax}'$), Bx'=($a_{Bx}'$, $b_{Bx}'$), Cx'=($a_{Cx}'$, $b_{Cx}'$) Dx'=($a_{Dx}'$, $b_{Dx}'$), . . . ;

a third conversion matrix module, which functions to determine a third conversion matrix between the two-dimensional color (a*, b*) of the two-dimensional color plane Lx and the target two-dimensional color (a*', b*') of the two-dimensional color plane Lx' according to the specific, most-saturated outer perimeter points Ax', Bx', Cx', Dx', . . . of the two-dimensional color plane Lx' and the specific, most-saturated outer perimeter points Ax, Bx, Cx, Dx, . . . of the two-dimensional color plane Lx;

a target space color module, which functions to apply the third conversion matrix to calculate a color-converted and adjusted target color for the color of one point of the original diagram data on the two-dimensional color plane Lx; and a target data output module, which functions to output or store target diagram data corresponding to color-converted and adjusted target color.

To address the above technical issue, the present invention adopts a technical solution by providing a liquid crystal display device. The device comprises:

an original data input module, which functions for inputting original diagram data based on CIE Lab three-dimensional color space;

a division module, which functions to equally divide the space in which all the colors corresponding to the original diagram data are located into n two-dimensional color planes of the color space according to lightness so as to form n two-dimensional color planes L1, L2, L3, . . . , Ln-1, and Ln, where n is a nature number;

a first corresponding relationship module, which functions to determine specific most saturated points An, Bn, Cn, Dn, . . . of the original diagram data on an outer perimeter of the two-dimensional color plane Ln and determining specific most saturated points An', Bn', Cn', Dn', . . . on an outer perimeter of the target two-dimensional color plane Ln' that is of the same lightness level as the two-dimensional color plane Ln of the original diagram data, wherein the specific most saturated points An', Bn', Cn', Dn', . . . on the outer perimeter of the two-dimensional color plane Ln' and the specific most saturated points An, Bn, Cn, Dn, . . . on the outer perimeter of the two-dimensional color plane Ln form a first one-to-one corresponding relationship;

a first conversion matrix module, which functions to determine a first conversion matrix according to the first one-to-one corresponding relationship between the specific, most-saturated outer perimeter points An', Bn', Cn', Dn', . . . of the two-dimensional color plane Ln' and the specific, most-saturated outer perimeter points An, Bn, Cn, Dn, . . . of the two-dimensional color plane Ln and converting the two-dimensional color (a, b) of one of the specific, most-saturated outer perimeter points of the two-dimensional color plane Ln into two-dimensional (a', b') of the point of the target two-dimensional color plane Ln' corresponding to said one specific, most-saturated outer perimeter point according to the first conversion matrix;

a second corresponding relationship module, which functions to determine a second one-to-one corresponding relationship between specific most-saturated points An-1', Bn-1', Cn-1', Dn-1', . . . on outer perimeter of a target two-dimensional color plane Ln-1' and specific most-saturated points of the original diagram data An-1, Bn-1, Cn-1, Dn-1, . . . on outer perimeter of the two-dimensional color plane Ln-1 according to the first one-to-one corresponding relationship;

a second conversion matrix module, which functions to determine a second conversion matrix according to the second one-to-one corresponding relationship and convert the two-dimensional color (a, b) of one of the specific, most-saturated outer perimeter points of the two-dimensional color plane Ln-1 into the two-dimensional color (a', b') of the point of the target two-dimensional color plane Ln-1' that corresponds to said one specific, most-saturated outer perimeter point according to the second conversion matrix;

a calculation module, which functions to calculate the two-dimensional color (a, b) of specific, most-saturated outer perimeter points Ax, Bx, Cx, Dx, . . . of a two-dimensional color plane Lx having a lightness level between the two-dimensional color plane Ln and the two-dimensional color plane Ln-1 according to the two-dimensional color (a, b) of the specific, most-saturated outer perimeter points An, Bn, Cn, Dn, . . . of the two-dimensional color plane Ln and the two-dimensional color (a, b) of the specific, most-saturated outer perimeter points An-1, Bn-1, Cn-1, Dn-1, . . . of the two-dimensional color plane Ln-1, wherein Ax=($a_{Ax}$, $b_{Ax}$), Bx=($a_{Bx}$, $b_{Bx}$), Cx=($a_{Cx}$, $b_{Cx}$), Dx=($a_{Dx}$, $b_{Dx}$), . . . and calculate the two-dimensional color (a', b') of specific, most-saturated outer perimeter points Ax', Bx', Cx', Dx', . . . of a two-dimensional color plane Lx' having a lightness level between the two-dimensional color plane Ln' and the two-dimensional color plane Ln-1' according to the two-dimensional color (a', b') of the specific, most-saturated outer perimeter points An', Bn', Cn', Dn', . . . of the two-dimensional color plane Ln' and the two-dimensional color (a', b') of the specific, most-saturated outer perimeter points An-1', Bn-1', Cn-1', Dn-1', . . . of the two-dimensional color plane Ln-1', wherein Ax'=($a_{Ax}'$, $b_{Ax}'$), Bx'=($a_{Bx}'$, $b_{Bx}'$), Cx'=($a_{Cx}'$, $b_{Cx}'$), Dx'=($a_{Dx}'$, $b_{Dx}'$), . . . ;

a third conversion matrix module, which functions to determine a third conversion matrix between the two-dimensional color (a*, b*) of the two-dimensional color plane Lx and the target two-dimensional color (a*', b*') of the two-dimensional color plane Lx' according to the specific, most-saturated outer perimeter points Ax', Bx', Cx', Dx', . . . of the two-dimensional color plane Lx' and the specific, most-saturated outer perimeter points Ax, Bx, Cx, Dx, . . . of the two-dimensional color plane Lx;

a target space color module, which functions to apply the third conversion matrix to calculate a color-converted and adjusted target color for the color of one point of the original diagram data on the two-dimensional color plane Lx; and a display module, which functions to make displaying of target diagram data according to color-converted and adjusted target color.

The efficacy of the present invention is that to be distinguished from the state of the art, the present invention converts the two-dimensional color plane Ln and the two-dimensional color plane Ln-1 of the original diagram data, through a conversion matrix, into the target two-dimensional color plane Ln' and the target two-dimensional color plane Ln-1', calculates a two-dimensional color plane Lx between the two-dimensional color plane Ln and the two-dimensional color plane Ln-1 according to the two-dimensional color plane Ln and the two-dimensional color plane Ln-1, calculates a two-dimensional color plane Lx' between the two-dimensional color plane Ln' and the two-dimensional color plane Ln-1' and having the same lightness level as the two-dimensional color plane Lx according to the two-dimensional color plane Ln' and the two-dimensional color plane Ln-1', calculates a conversion matrix between the two-dimensional color plane Lx and the two-dimensional color plane Lx' according to the two-dimensional color planes Lx and Lx', calculating color-converted and adjusted target color for the color of each point of the original diagram data on the two-dimensional color plane Lx according to the conversion matrix between the two-dimensional color plane Lx and the two-dimensional color plane Lx' and completing color space of the target color. With such a process, it is possible to make conversion of color signal in a CIE Lab color space, adjust hue and color purity of output color, and may also possibly enhance and highlight a preferred color.

BRIEF DESCRIPTION OF THE DRAWINGS

FIG. 1 shows a flow chart of a CIE Lab color space based color conversion method according to an embodiment of the present invention;

DETAILED DESCRIPTION OF THE PREFERRED EMBODIMENTS

A detailed description will be given to the present invention with reference to the attached drawings and embodiments.

FIG. 1 shows a flow chart of a CIE Lab color space based color conversion method according to an embodiment of the present invention. As shown in FIG. 1, the method comprises the following steps:

Step S101: inputting original diagram data based on CIE Lab three-dimensional color space.

The Lab three-dimensional color space is established on the theory that a color cannot be both blue and yellow at the same time so that a single value can be used to describe characteristics of magenta/green and yellow/blue, wherein L indicates lightness, a indicates magenta/green value, and b indicates yellow/blue value. A coordinate system comprises of mutually perpendicular axes of L, a, and b is established to represent a color space, in which L is lightness with black at the lower side and white at the upper side; +a indicates magenta, −a indicates green; +b indicates yellow, −b indicates blue; and a-axis is magenta/green axis and b-axis is yellow-blue axis.

Step S102: equally dividing the space in which all the colors corresponding to the original diagram data are located into n two-dimensional color planes of the color space according to lightness so as to form n two-dimensional color planes L1, L2, L3, . . . , Ln-1, and Ln, where n is a nature number.

The two-dimensional plane is a two-dimensional color plane that is constituted by magenta/green color of a-axis and yellow-blue of b-axis. The space that is constituted by L-axis, a-axis, and b-axis for all the colors corresponding to the original diagram data is equally divided, according to lightness L, into n two-dimensional color planes constituted by a-axis and b-axis, whereby the space of all the colors corresponding to the original diagram data that is a three-dimensional space is divided, in an equal manner according to lightness, into n two-dimensional color planes so that the complicated color conversion problem is simplified. A specific process of division is that the three-dimensional color space constituted by the L-axis, a-axis, and b-axis is subjected to equal division according the lightness of L-axis into n two-dimensional color planes constituted by a-axis and b-axis, wherein the values of lightness of the n two-dimensional color planes constituted by a-axis and b-axis are respectively L1, L2, L3, . . . , Ln-1, and Ln.

Figure 2:
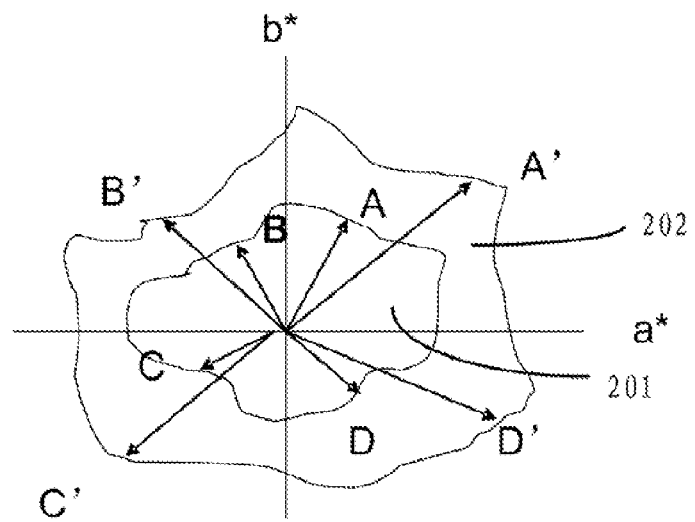
FIG. 2 is a schematic view showing color contents of original two-dimensional color space and target two-dimensional color space in the CIE Lab color space based color conversion method according to the embodiment of the present invention.

As shown in FIG. 2, the space of all the colors of the original diagram that is originally a uniform three-dimensional Lab color space is equally divided, according to lightness, into n zones of lightness, the two-dimensional color contents of the n equally-divided lightness planes constitutes a two-dimensional color plane Ln201 in the space SA where the original color is present. Hue and color purity of the output color are adjusted according to preference so as to generate a two-dimensional color plane Ln'202 of a target color space SB having new two-dimensional color contents and the same lightness. FIG. 2 shows the color contents of the two-dimensional color plane Ln201 and the two-dimensional color plane Ln'202 that are of the same lightness.

Before Step S102, the method also comprises a step of determining the number n of the two-dimensional color planes that are formed by equally dividing, according to lightness, the space to which all the colors of the original diagram data corresponds on the basis of proportional relationship between the preciseness of color conversion and the number of divisions made on the color space. The higher the preciseness of color conversion is, the greater the number n of divisions that must be made on the color space will be. On the other hand, the less the preciseness of color conversion is, the smaller the number of divisions needed will be.

Step S103: determining specific most saturated points An, Bn, Cn, Dn, . . . of the original diagram data on an outer perimeter of the two-dimensional color plane Ln and determining specific most saturated points An', Bn', Cn', Dn', . . . on an outer perimeter of the target two-dimensional color plane Ln' that is of the same lightness level as the two-dimensional color plane Ln of the original diagram data, wherein the specific most saturated points An', Bn', Cn', Dn', . . . on the outer perimeter of the two-dimensional color plane Ln' and the specific most saturated points An, Bn, Cn, Dn, . . . on the outer perimeter of the two-dimensional color plane Ln form a first one-to-one corresponding relationship.

Color saturation is an important constituent factor of color, which refers to purity of color. The higher the purity is, the brighter the color is; the lower the purity is, the darker the color is. The term "most saturated" means the highest purity of color.

The one-to-one corresponding relationship between the two-dimensional color plane of the original diagram data and the target two-dimensional color plane is helpful for determining the conversion relationship between the two-dimensional color plane of the original diagram data and the target two-dimensional color plane.

As shown in FIG. 2, the specific points on the outer perimeter of the target two-dimensional color plane Ln'202 that are of the greatest color purity of the two-dimensional color contents are points An', Bn', Cn', Dn', and the specific points on the outer perimeter of the two-dimensional color plane Ln201 that are of the greatest color purity are An, Bn, Cn, Dn, . . . . These specific points are adjusted for hue and color purity according to preference so as to generate target color. As shown in FIG. 2, a one-to-one corresponding relationship exists between the specific outer perimeter points A, B, C, D, . . . of the two-dimensional color plane Ln201 and the specific outer perimeter points A', B', C', D', . . . of the two-dimensional color plane Ln'202.

Before Step S103, the method further comprises a step of determining the number of the specific, most-saturated outer perimeter points of the two-dimensional color plane on the basis of proportional relationship between the preciseness of color conversion and the number of the specific most-saturated outer perimeter points of the two-dimensional color plane. The number of the specific, most-saturated outer perimeter points is determined according to the preciseness of color conversion. The higher the preciseness of color conversion is, the greater the number of the specific, most-saturated outer perimeter points selected will be. On the other hand, the less the preciseness of color conversion is, the smaller the number of the specific, most-saturated outer perimeter points will be.

Step S104: determining a first conversion matrix according to the first one-to-one corresponding relationship between the specific, most-saturated outer perimeter points An', Bn', Cn', Dn', . . . of the two-dimensional color plane Ln' and the specific, most-saturated outer perimeter points An, Bn, Cn, Dn, . . . of the two-dimensional color plane Ln and converting the two-dimensional color (a, b) of one of the specific, most-saturated outer perimeter points of the two-dimensional color plane Ln into two-dimensional (a', b') of the point of the target two-dimensional color plane Ln' corresponding to said one specific, most-saturated outer perimeter point according to the first conversion matrix.

A matrix is a two-dimensional array of numbers and a mathematic tool for handling linear equation set. The first conversion matrix is a matrix that satisfies certain linear conversion relationship between the two-dimensional color (a, b) of one of the specific, most-saturated outer perimeter points of the two-dimensional color plane Ln and the two-dimensional color (a', b') of the point of the target two-dimensional color plane Ln' that corresponds to said one specific, most-saturated outer perimeter point.

The first conversion matrix is determined according to the first one-to-one corresponding relationship between the specific, most-saturated outer perimeter points of the two-dimensional color plane Ln and the specific, most-saturated outer perimeter points of the target two-dimensional color plane Ln'. The conversion matrix can convert the two-dimensional color (a, b) of any one of the specific, most-saturated outer perimeter points of the two-dimensional color plane Ln into the two-dimensional color (a', b') of the point of the target two-dimensional color plane Ln' that corresponds to said one specific, most-saturated outer perimeter point. Thus, all the two-dimensional color (a', b') of the target two-dimensional color plane Ln' can be determined.

Step S105: determining a second one-to-one corresponding relationship between specific most-saturated points An-1', Bn-1', Cn-1', Dn-1', . . . on outer perimeter of a target two-dimensional color plane Ln-1' and specific most-saturated points of the original diagram data An-1, Bn-1, Cn-1, Dn-1, . . . on outer perimeter of the two-dimensional color plane Ln-1 according to the first one-to-one corresponding relationship, determining a second conversion matrix according to the second one-to-one corresponding relationship, and converting the two-dimensional color (a, b) of one of the specific, most-saturated outer perimeter points of the two-dimensional color plane Ln-1 into the two-dimensional color (a', b') of the point of the target two-dimensional color plane Ln-1' that corresponds to said one specific, most-saturated outer perimeter point according to the second conversion matrix.

A matrix is a two-dimensional array of numbers and a mathematic tool for handling linear equation set. The second conversion matrix is a matrix that satisfies certain linear conversion relationship between the two-dimensional color (a, b) of one of the specific, most-saturated outer perimeter points of the two-dimensional color plane Ln-1 and the two-dimensional color (a', b') of the point of the target two-dimensional color plane Ln-1' that corresponds to said one specific, most-saturated outer perimeter point.

In a similar way, the second conversion matrix is determined according to the second one-to-one corresponding relationship between the specific, most-saturated outer perimeter points of the two-dimensional color plane Ln-1 and the specific, most-saturated outer perimeter points of the target two-dimensional color plane Ln-1'. The conversion matrix can convert the two-dimensional color (a, b) of any one of the specific, most-saturated outer perimeter points of the two-dimensional color plane Ln-1 into the two-dimensional color (a', b') of the point of the target two-dimensional color plane Ln-1' that corresponds to said one specific, most-saturated outer perimeter point. Thus, all the two-dimensional color (a', b') of the target two-dimensional color plane Ln-1' can be determined.

In a practical application, Step S104 can be performed after Step S105. There is no specific requirement for the sequence of Step S104 and Step S105.

Step S106: calculating the two-dimensional color (a, b) of specific, most-saturated outer perimeter points Ax, Bx, Cx, Dx, . . . of a two-dimensional color plane Lx having a lightness level between the two-dimensional color plane Ln and the two-dimensional color plane Ln-1 according to the two-dimensional color (a, b) of the specific, most-saturated outer perimeter points An, Bn, Cn, Dn, . . . of the two-dimensional color plane Ln and the two-dimensional color (a, b) of the specific, most-saturated outer perimeter points An-1, Bn-1, Cn-1, Dn-1, . . . of the two-dimensional color plane Ln-1, wherein Ax=$(a_{Ax}, b_{Ax})$, Bx=$(a_{Bx}, b_{Bx})$, Cx=$(a_{Cx}, b_{Cx})$, Dx=$(a_{Dx}, b_{Dx})$, . . . and calculating the two-dimensional color (a', b') of specific, most-saturated outer perimeter points Ax', Bx', Cx', Dx', . . . of a two-dimensional color plane Lx' having a lightness level between the two-dimensional color plane Ln' and the two-dimensional color plane Ln-1' according to the two-dimensional color (a', b') of the specific, most-saturated outer perimeter points An', Bn', Cn', Dn', of the two-dimensional color plane Ln' and the two-dimensional color (a', b') of the specific, most-saturated outer perimeter points An-1', Bn-1', Cn-1', Dn-1', . . . of the two-dimensional color plane Ln-1', wherein Ax'=$(a_{Ax}', b_{Ax}')$, Bx'=$(a_{Bx}', b_{Bx}')$, Cx'=$(a_{Cx}', b_{Cx}')$, Dx'=$(a_{Dx}', b_{Dx}')$, . . . .

The two-dimensional color (a, b) of the specific, most-saturated outer perimeter points of the two-dimensional color plane Lx having a lightness level between the two-dimensional color plane Ln and the two-dimensional color plane Ln-1 is calculated according to the two-dimensional color (a, b) of the specific, most-saturated outer perimeter points of the two-dimensional color plane Ln and the two-dimensional color (a, b) of the specific, most-saturated outer perimeter points of the color planes Ln-1. And, the two-dimensional color (a', b') of the specific, most-saturated outer perimeter points of the two-dimensional color plane Lx' between the two-dimensional color plane Ln' and the two-dimensional color plane Ln-1' and having the same lightness level as the two-dimensional color plane Lx is calculated according to the two-dimensional color (a', b') of the specific, most-saturated outer perimeter points of the two-dimensional color plane Ln' and the two-dimensional color (a', b') of the specific, most-saturated outer perimeter points of the color planes Ln-1'.

Figure 3:
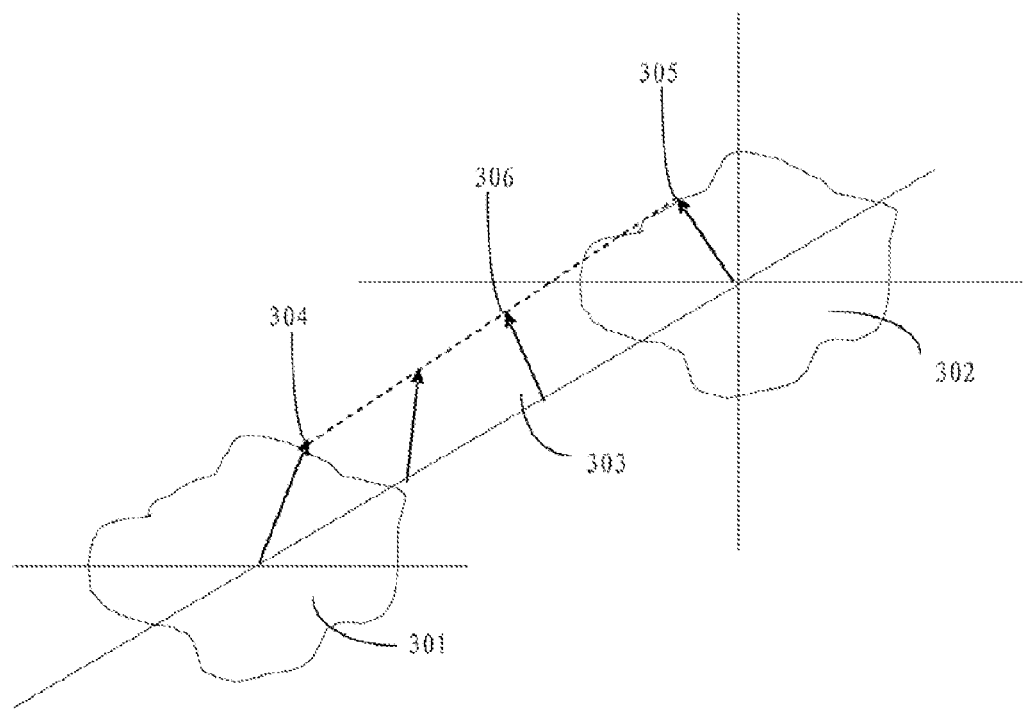
FIG. 3 is a schematic view showing three specific, most-saturated outer perimeter points of the original two-dimensional color space in the CIE Lab color space based color conversion method according to the embodiment of the present invention.

As shown in FIG. 3, the specific, most-saturated outer perimeter points Ax, Bx, Cx, Dx, . . . of a two-dimensional color plane Lx303 that has a lightness level between a two-dimensional color plane Ln301 and a two-dimensional color plane Ln-1302 are first determined through interpolation according to the specific, most-saturated outer perimeter points An, Bn, Cn, Dn, . . . of the two-dimensional color plane Ln301 and the specific, most-saturated outer perimeter points An', Bn', Cn', Dn', . . . of the two-dimensional color plane Ln-1302, wherein An($a_n, b_n$) 304, An-1 ($a_{n-1}, b_{n-1}$) 305, and Ax($a_x, b_x$) 306 are three most representative most saturated outer perimeter points of the two-dimensional color planes Ln301, Ln-1302, and Lx303.

Figure 4:
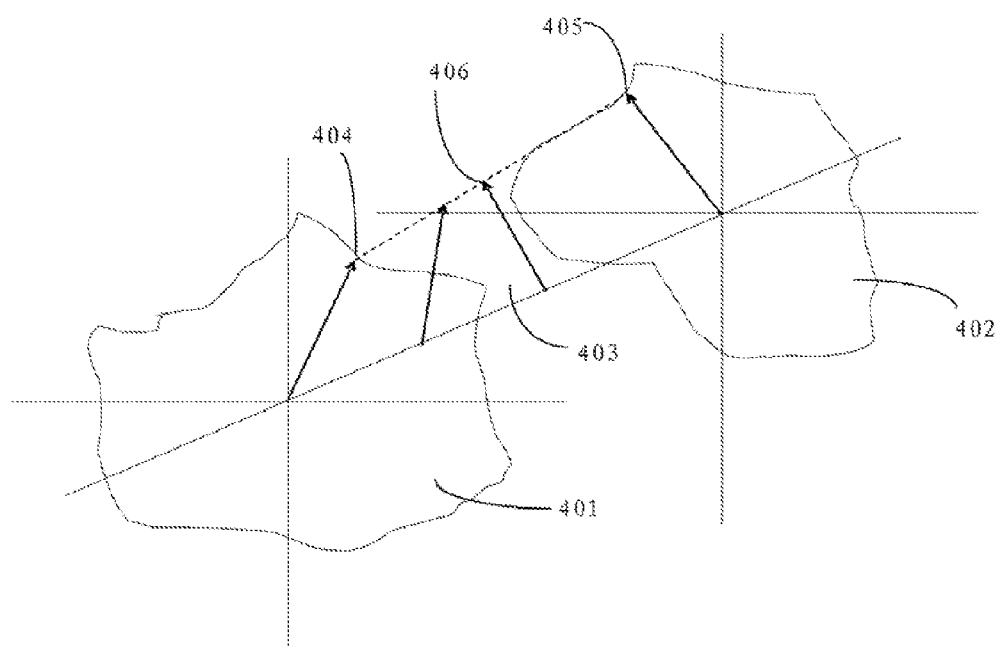
FIG. 4 is a schematic view showing three specific, most-saturated outer perimeter points of the target two-dimensional color space in the CIE Lab color space based color conversion method according to the embodiment of the present invention.

As shown in FIG. 4, for color conversion between a two-dimensional color plane Ln having any lightness within the space of n equal division of lightness (L1, L2, L3, L4, Ln) and a two-dimensional color plane Ln', the specific, most-saturated outer perimeter points Ax', Bx', Cx', Dx', . . . of a two-dimensional color plane Lx'403 that has a lightness level between a two-dimensional color plane Ln'401 and a two-dimensional color plane Ln-1'402 are first determined through interpolation according to the specific, most-saturated outer perimeter points An', Bn', Cn', Dn', . . . of the two-dimensional color plane Ln'401 and the specific, most-saturated outer perimeter points An-1', Bn-1', Cn-1', Dn-1', . . . of the two-dimensional color plane Ln-1'402, wherein An'($a_n'$, $b_n'$) 404, An-1'($a_{n-1}'$, $b_{n-1}'$) 405, and Ax'($a_x'$, $b_x'$) 406 are three most representative most saturated outer perimeter points of the two-dimensional color planes Ln'401, Ln-1'402, and Lx'403.

Step S107: determining a third conversion matrix between the two-dimensional color (a*, b*) of the two-dimensional color plane Lx and the target two-dimensional color (a*', b*') of the two-dimensional color plane Lx' according to the specific, most-saturated outer perimeter points Ax', Bx', Cx', Dx', . . . of the two-dimensional color plane Lx' and the specific, most-saturated outer perimeter points Ax, Bx, Cx, Dx, . . . of the two-dimensional color plane Lx.

A matrix is a two-dimensional array of numbers and a mathematic tool for handling linear equation set. The third conversion matrix is a matrix that satisfies certain linear conversion relationship between the two-dimensional color (a, b) of one point of the two-dimensional color plane Lx and the two-dimensional color (a', b') of the point of the target two-dimensional color plane Lx' that corresponds to said one point.

As shown in FIGS. 3 and 4, a third conversion matrix is determined according to a one-to-one corresponding relationship between the specific, most-saturated outer perimeter points Ax, Bx, Cx; Dx, . . . of the two-dimensional color plane Lx303 and the specific, most-saturated outer perimeter points Ax', Bx', Cx', Dx', . . . of the target two-dimensional color plane Lx'403.

Step S108: applying the third conversion matrix to calculate a color-converted and adjusted target color for the color of one point of the original diagram data on the two-dimensional color plane Lx.

The two-dimensional color (a, b) of any one point of the two-dimensional color plane Lx can be converted into the two-dimensional color (a', b') of the point of the target two-dimensional color plane Lx' that corresponds to said one point according to the third conversion matrix, whereby all the two-dimensional color (a', b') of the target two-dimensional color plane Lx' can be determined.

Step S109: outputting or storing target diagram data corresponding to color-converted and adjusted target color.

Figure 5:
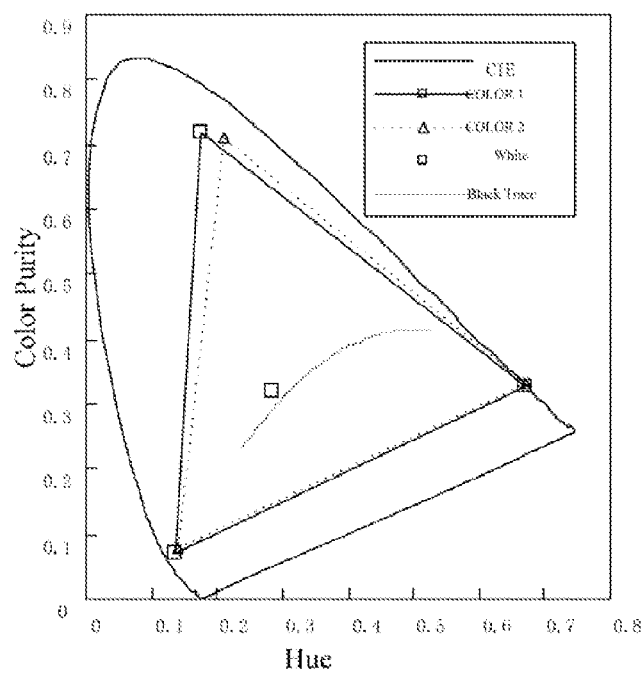
FIG. 5 is a schematic view illustrating the relationship between two-dimensional hue and color purity of CIE 1931 color space.

FIG. 5 is a schematic view illustrating the relationship between two-dimensional hue and color purity of CIE 1931 color space according to the present invention. As shown in FIG. 5, an original diagram RBG input signal shows color performance in the CIE 1931 color space comprising color contents indicated by "COLOR 1". The R, G, B signals are converted as desired to change the color performance from "COLOR 1" to "COLOR 2", in which the original green color is made to show a more yellowish color. Such a signal conversion allows the original greenish hue of a display device to be converted into a yellowish hue, improving overall softness of images.

Figure 6:
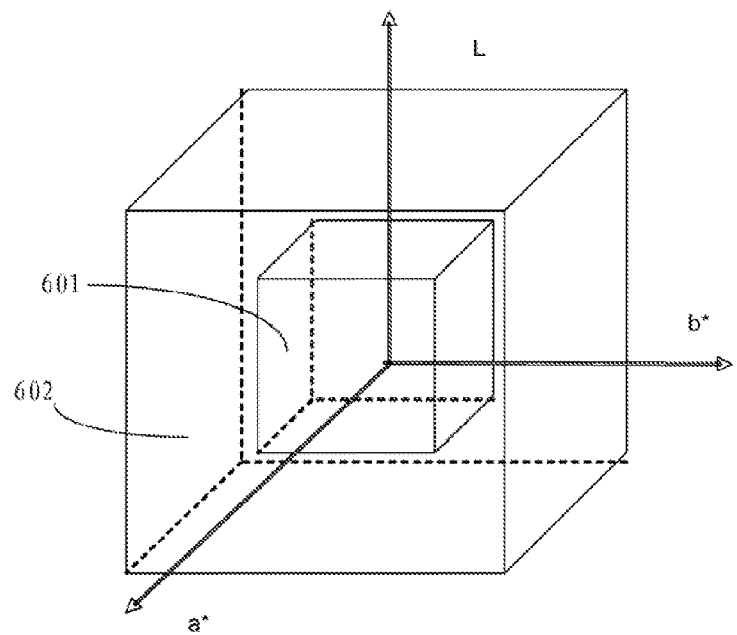
FIG. 6 is schematic view illustrating the relationship between three-dimensional hue and color purity in a CIE Lab color space according to the present invention.

FIG. 6 is schematic view illustrating the relationship between three-dimensional hue and color purity in a CIE Lab color space according to the present invention. As shown in FIG. 6, the space in which all the colors of an original diagram are located is SA601. (It is noted that SA601 is not necessarily a cubic color space composed of all the colors as shown in FIG. 6, and may be of contents distribution in a curved-surface color space.) Adjustment is made as desired to adjust the output color performance of hue and purity so that all the colors of the contents of the original diagram can be converted into a space SB602. (It is noted that SB602 is not necessarily a cubic color space composed of all the colors and may be of contents distribution in a curved-surface color space.)

In a preferred embodiment of the present invention, the first conversion matrix is:

$$\begin{bmatrix} a_n' \\ b_n' \end{bmatrix} = \begin{bmatrix} a11 & a12 & a13 & a14 & a15 & a16 & a17 & a18 & a19 & a20 \\ a21 & a22 & a23 & a24 & a25 & a26 & a27 & a28 & a29 & a30 \end{bmatrix} \times \begin{bmatrix} a_n^3 \\ b_n^3 \\ a_n^2 b_n \\ a_n b_n^2 \\ a_n^2 \\ b_n^2 \\ a_n b_n \\ a_n \\ b_n \\ 1 \end{bmatrix}$$

The first conversion matrix is a matrix that satisfies certain linear conversion relationship between the two-dimensional color (a, b) of one of the specific, most-saturated outer perimeter points of the two-dimensional color plane Ln and the two-dimensional color (a', b') of the point of the target two-dimensional color plane Ln' that corresponds to said one specific, most-saturated outer perimeter point. In a preferred embodiment, the linear conversion relationship that is satisfied by the two-dimensional color (a, b) of one of the specific, most-saturated outer perimeter points of the two-dimensional color plane Ln and the two-dimensional color (a', b') of the point of the target two-dimensional color plane Ln' that corresponds to said one specific, most-saturated outer perimeter point is a functional relationship of cubic polynomial. In the first conversion matrix, the left hand side of the equal sign is the target matrix, while the first matrix on the right hand side of the equal sign is coefficient matrix of the functional relationship of cubic polynomial and the second matrix on the right hand side of the equal sign is the variable matrix of the functional relationship of cubic polynomial.

In a practical application, the linear conversion relationship that is satisfied by the two-dimensional color (a, b) of one of the specific, most-saturated outer perimeter points of the two-dimensional color plane Ln and the two-dimensional color (a', b') of the point of the target two-dimensional color plane Ln' that corresponds to said one specific, most-saturated outer perimeter point is a polynomial function of higher than degree three, such as polynomial of degree four and polynomial of degree five. For a polynomial of higher than degree three, the number of rows of the coefficient matrix and the number of columns of the variable matrix must be adjusted accordingly.

The second conversion matrix is:

$$\begin{bmatrix} a_{n-1}' \\ b_{n-1}' \end{bmatrix} =$$

$$\begin{bmatrix} a11 & a12 & a13 & a14 & a15 & a16 & a17 & a18 & a19 & a20 \\ a21 & a22 & a23 & a24 & a25 & a26 & a27 & a28 & a29 & a30 \end{bmatrix} \times \begin{bmatrix} a_{n-1}^3 \\ b_{n-1}^3 \\ a_{n-1}^2 b_{n-1} \\ a_{n-1} b_{n-1}^2 \\ a_{n-1}^2 \\ b_{n-1}^2 \\ a_{n-1} b_{n-1} \\ a_{n-1} \\ b_{n-1} \\ 1 \end{bmatrix}$$

The second conversion matrix is a matrix that satisfies certain linear conversion relationship between the two-dimensional color (a, b) of one of the specific, most-saturated outer perimeter points of the two-dimensional color plane Ln-1 and the two-dimensional color (a', b') of the point of the target two-dimensional color plane Ln-1' that corresponds to said one specific, most-saturated outer perimeter point. In a preferred embodiment, the linear conversion relationship that is satisfied by the two-dimensional color (a, b) of one of the specific, most-saturated outer perimeter points of the two-dimensional color plane Ln-1 and the two-dimensional color (a', b') of the point of the target two-dimensional color plane Ln-1' that corresponds to said one specific, most-saturated outer perimeter point is a functional relationship of cubic polynomial. In the second conversion matrix, the left hand side of the equal sign is the target matrix, while the first matrix on the right hand side of the equal sign is coefficient matrix of the functional relationship of cubic polynomial and the second matrix on the right hand side of the equal sign is the variable matrix of the functional relationship of cubic polynomial.

In a practical application, the linear conversion relationship that is satisfied by the two-dimensional color (a, b) of one of the specific, most-saturated outer perimeter points of the two-dimensional color plane Ln and the two-dimensional color (a', b') of the point of the target two-dimensional color plane Ln' that corresponds to said one specific, most-saturated outer perimeter point is a polynomial function of higher than degree three, such as polynomial of degree four and polynomial of degree five. For a polynomial of higher than degree three, the number of rows of the coefficient matrix and the number of columns of the variable matrix must be adjusted accordingly.

The step of calculating the two-dimensional color (a, b) of specific, most-saturated outer perimeter points Ax, Bx, Cx, Dx, . . . of a two-dimensional color plane Lx having a lightness level between the two-dimensional color plane Ln and the two-dimensional color plane Ln-1 according to the two-dimensional color (a, b) of the specific, most-saturated outer perimeter points An, Bn, Cn, Dn, . . . of the two-dimensional color plane Ln and the two-dimensional color (a, b) of the specific, most-saturated outer perimeter points An-1, Bn-1, Cn-1, Dn-1, . . . of the two-dimensional color plane Ln-1, wherein Ax=$(a_{Ax}, b_{Ax})$, Bx=$(a_{Bx}, b_{Bx})$, Cx=$(a_{Cx}, b_{Cx})$, Dx=$(a_{Dx}, b_{Dx})$, . . . , comprises carrying out the calculation according to first relationships between Ax, Bx, Cx, Dx, . . . and An, Bn, Cn, Dn, . . . and An-1, Bn-1, Cn-1, Dn-1, . . . in order to obtain the two-dimensional color (a, b) of the specific, most-saturated outer perimeter points Ax, Bx, Cx, Dx, . . . of the two-dimensional color plane Lx having a lightness level between the two-dimensional color plane Ln and the two-dimensional color plane Ln-1, wherein the first relationships are as follows:

$$a_x = a_n + (L_x - L_n) * (a_{n-1} - a_n)/(L_{n-1} - L_n)$$

$$b_x = b_n + (L_x - L_n) * (b_{n-1} - b_n)/(L_{n-1} - L_n)$$

The two-dimensional color (a, b) of the specific, most-saturated outer perimeter points Ax, Bx, Cx, Dx, . . . of a two-dimensional color plane Lx having a lightness level between the two-dimensional color plane Ln and the two-dimensional color plane Ln-1 can be obtained according to the first relationships.

The step of calculating the two-dimensional color (a', b') of specific, most-saturated outer perimeter points Ax', Bx', Cx', Dx', . . . of a two-dimensional color plane Lx' between Ln' and Ln-1' and having the same lightness level as Lx according to the two-dimensional color (a', b') of An', Bn', Cn', Dn', . . . of the color plane Ln' and the two-dimensional color (a', b') of An-1', Bn-1', Cn-1', Dn-1', . . . of the color plane Ln-1', wherein Ax'=$(a_{Ax}', b_{Ax}')$, Bx'=$(a_{Bx}', b_{Bx}')$, Cx'=$(a_{Cx}', b_{Cx}')$, Dx'=$(a_{Dx}', b_{Dx}')$, . . . , comprises carrying out the calculation according to second relationships between Ax', Bx', Cx', Dx', and An', Bn', Cn', Dn', . . . and An-1', Bn-1', Cn-1', Dn-1', . . . in order to obtain the two-dimensional color (a', b') of the specific, most-saturated outer perimeter points Ax', Bx', Cx', Dx', . . . of the two-dimensional color plane Lx' between Ln' and Ln-1' and having the same lightness level as Lx, wherein the second relationships are as follows:

$$a_x' = a_n' + (L_x - L_n) * (a_{n-1}' - a_n')/(L_{n-1} - L_n)$$

$$b_x' = b_n' + (L_x - L_n) * (b_{n-1}' - b_n')/(L_{n-1} - L_n)$$

The two-dimensional color (a', b') of the specific, most-saturated outer perimeter points Ax', Bx', Cx', Dx', . . . of a two-dimensional color plane Lx' having a lightness level between the two-dimensional color plane Ln' and the two-dimensional color plane Ln-1' can be obtained according to the second relationships.

The third conversion matrix between the two-dimensional color (a*, b*) of the two-dimensional color plane Lx and the target two-dimensional color (a*', b*') of the two-dimensional color plane Lx' is:

$$\begin{bmatrix} a_x' \\ b_x' \end{bmatrix} = \begin{bmatrix} a11 & a12 & a13 & a14 & a15 & a16 & a17 & a18 & a19 & a20 \\ a21 & a22 & a23 & a24 & a25 & a26 & a27 & a28 & a29 & a30 \end{bmatrix} \times \begin{bmatrix} a_x^3 \\ b_x^3 \\ a_x^2 b_x \\ a_x b_x^2 \\ a_x^2 \\ b_x^2 \\ a_x b_x \\ a_{x-1} \\ b_{x-1} \\ 1 \end{bmatrix}$$

The third conversion matrix is a matrix that satisfies certain linear conversion relationship between the two-dimensional color (a, b) of one of the specific, most-saturated outer perimeter points of the two-dimensional color plane Lx and the two-dimensional color (a', b') of the point of the target two-dimensional color plane Lx' that corresponds to said one specific, most-saturated outer perimeter point. In a preferred embodiment, the linear conversion relationship that is satisfied by the two-dimensional color (a, b) of one of the specific, most-saturated outer perimeter points of the two-dimensional color plane Lx and the two-dimensional color (a', b') of the point of the target two-dimensional color plane Lx' that corresponds to said one specific, most-saturated outer perimeter point is a functional relationship of cubic polynomial. In the third conversion matrix, the left hand side of the equal sign is the target matrix, while the first matrix on the right hand side of the equal sign is coefficient matrix of the functional relationship of cubic polynomial and the second matrix on the right hand side of the equal sign is the variable matrix of the functional relationship of cubic polynomial.

In a practical application, the linear conversion relationship that is satisfied by the two-dimensional color (a, b) of one of the specific, most-saturated outer perimeter points of the two-dimensional color plane Lx and the two-dimensional color (a', b') of the point of the target two-dimensional color plane Lx' that corresponds to said one specific, most-saturated outer perimeter point is a polynomial function of higher than degree three, such as polynomial of degree four and polynomial of degree five. For a polynomial of higher than degree three, the number of rows of the coefficient matrix and the number of columns of the variable matrix must be adjusted accordingly.

To be distinguished from the state of the art, the present invention converts the two-dimensional color plane Ln and the two-dimensional color plane Ln-1 of the original diagram data, through a conversion matrix, into the target two-dimensional color plane Ln' and the target two-dimensional color plane Ln-1', calculates a two-dimensional color plane Lx having a lightness level between the two-dimensional color plane Ln and the two-dimensional color plane Ln-1 according to the two-dimensional color plane Ln and the two-dimensional color plane Ln-1, calculates a two-dimensional color plane Lx' between the two-dimensional color plane Ln' and the two-dimensional color plane Ln-1' and having the same lightness level as the two-dimensional color plane Lx according to the two-dimensional color plane Ln' and the two-dimensional color plane Ln-1', calculates a conversion matrix between the two-dimensional color plane Lx and the two-dimensional color plane Lx' according to the two-dimensional color planes Lx and Lx', calculating color-converted and adjusted target color for the color of each point of the original diagram data on the two-dimensional color plane Lx according to the conversion matrix between the two-dimensional color plane Lx and the two-dimensional color plane Lx' and completing color space of the target color. With such a process, it is possible to make conversion of color signal in a CIE Lab color space, adjust hue and color purity of output color, and may also possibly enhance and highlight a preferred color.

Figure 7:
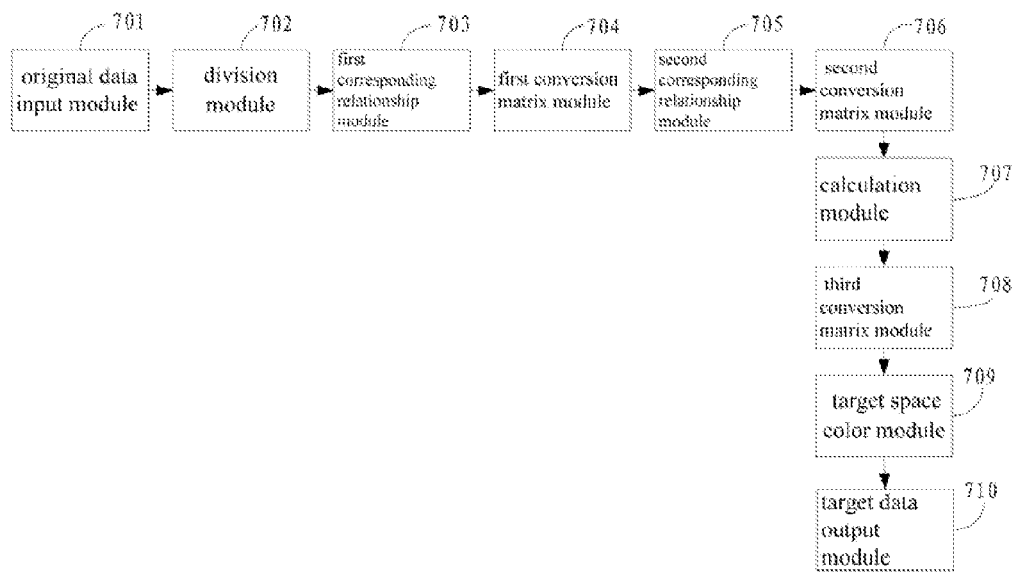
FIG. 7 is schematic view illustrating a CIE Lab color space based color conversion device according to an embodiment of the present invention.

FIG. 7 is schematic view illustrating a CIE Lab color space based color conversion device according to an embodiment of the present invention. As shown in FIG. 7, the device comprises an original data input module 701, a division module 702, a first corresponding relationship module 703, a first conversion matrix module 704, a second corresponding relationship module 705, a second conversion matrix module 706, a calculation module 707, a third conversion matrix module 708, a target space color module 709, and a target data output module 710.

The original data input module 701 functions for inputting original diagram data based on CIE Lab three-dimensional color space. The Lab three-dimensional color space is established on the theory that a color cannot be both blue and yellow at the same time so that a single value can be used to describe characteristics of magenta/green and yellow/blue, wherein L indicates lightness, a indicates magenta/green value, and b indicates yellow/blue value.

The division module 702 functions to equally divide the space in which all the colors corresponding to the original diagram data are located into n two-dimensional color planes of the color space according to lightness so as to form n two-dimensional color planes L1, L2, L3, . . . , Ln-1, and Ln, where n is a nature number.

The two-dimensional plane is a two-dimensional color plane that is constituted by magenta/green color of a-axis and yellow-blue of b-axis. The space that is constituted by L-axis, a-axis, and b-axis for all the colors corresponding to the original diagram data is equally divided, according to lightness L, into n two-dimensional color planes constituted by a-axis and b-axis, whereby the space of all the colors corresponding to the original diagram data that is a three-dimensional space is divided, in an equal manner according to lightness, into n two-dimensional color planes so that the complicated color conversion problem is simplified.

The first corresponding relationship module 703 functions to determine specific most saturated points An, Bn, Cn, Dn, . . . of the original diagram data on an outer perimeter of the two-dimensional color plane Ln and determining specific most saturated points An', Bn', Cn', Dn', . . . on an outer perimeter of the target two-dimensional color plane Ln' that is of the same lightness level as the two-dimensional color plane Ln of the original diagram data, wherein the specific most saturated points An', Bn', Cn', Dn', . . . on the outer perimeter of the two-dimensional color plane Ln' and the specific most saturated points An, Bn, Cn, Dn, . . . on the outer perimeter of the two-dimensional color plane Ln form a first one-to-one corresponding relationship.

The one-to-one corresponding relationship between the two-dimensional color plane of the original diagram data and the target two-dimensional color plane is helpful for determining the conversion relationship between the two-dimensional color plane of the original diagram data and the target two-dimensional color plane.

The first conversion matrix module 704 functions to determine a first conversion matrix according to the first one-to-one corresponding relationship between the specific, most-saturated outer perimeter points An', Bn', Cn', Dn', . . . of the two-dimensional color plane Ln' and the specific, most-saturated outer perimeter points An, Bn, Cn, Dn, . . . of the two-dimensional color plane Ln and converting the two-dimensional color (a, b) of one of the specific, most-saturated outer perimeter points of the two-dimensional color plane Ln into two-dimensional (a', b') of the point of the target two-dimensional color plane Ln' corresponding to said one specific, most-saturated outer perimeter point according to the first conversion matrix.

The first conversion matrix is determined according to the first one-to-one corresponding relationship between the specific, most-saturated outer perimeter points of the two-dimensional color plane Ln and the specific, most-saturated outer perimeter points of the target two-dimensional color plane Ln'. The conversion matrix can convert the two-dimensional color (a, b) of any one of the specific, most-saturated outer perimeter points of the two-dimensional color plane Ln into the two-dimensional color (a', b') of the point of the target two-dimensional color plane Ln' that corresponds to said one specific, most-saturated outer perimeter point. Thus, all the two-dimensional color (a', b') of the target two-dimensional color plane Ln' can be determined.

The second corresponding relationship module 705 functions to determine a second one-to-one corresponding relationship between specific most-saturated points An-1', Bn-1', Cn-1', Dn-1', . . . on outer perimeter of a target two-dimensional color plane Ln-1' and specific most-saturated points of the original diagram data An-1, Bn-1, Cn-1, Dn-1, . . . on outer perimeter of the two-dimensional color plane Ln-1 according to the first one-to-one corresponding relationship.

The second conversion matrix module 706 functions to determine a second conversion matrix according to the second one-to-one corresponding relationship and convert the two-dimensional color (a, b) of one of the specific, most-saturated outer perimeter points of the two-dimensional color plane Ln-1 into the two-dimensional color (a', b') of the point of the target two-dimensional color plane Ln-1' that corresponds to said one specific, most-saturated outer perimeter point according to the second conversion matrix.

In a similar way, the second conversion matrix is determined according to the second one-to-one corresponding relationship between the specific, most-saturated outer perimeter points of the two-dimensional color plane Ln-1 and the specific, most-saturated outer perimeter points of the target two-dimensional color plane Ln-1'. The conversion matrix can convert the two-dimensional color (a, b) of any one of the specific, most-saturated outer perimeter points of the two-dimensional color plane Ln-1 into the two-dimensional color (a', b') of the point of the target two-dimensional color plane Ln-1' that corresponds to said one specific, most-saturated outer perimeter point. Thus, all the two-dimensional color (a', b') of the target two-dimensional color plane Ln-1' can be determined.

The calculation module 707 functions to calculate the two-dimensional color (a, b) of specific, most-saturated outer perimeter points Ax, Bx, Cx, Dx, . . . of a two-dimensional color plane Lx having a lightness level between the two-dimensional color plane Ln and the two-dimensional color plane Ln-1 according to the two-dimensional color (a, b) of the specific, most-saturated outer perimeter points An, Bn, Cn, Dn, . . . of the two-dimensional color plane Ln and the two-dimensional color (a, b) of the specific, most-saturated outer perimeter points An-1, Bn-1, Cn-1, Dn-1, . . . of the two-dimensional color plane Ln-1, wherein Ax=($a_{Ax}$, $b_{Ax}$), Bx=($a_{Bx}$, $b_{Bx}$), Cx=($a_{Cx}$, $b_{Cx}$), Dx=($a_{Dx}$, $b_{Dx}$), . . . and calculate the two-dimensional color (a', b') of specific, most-saturated outer perimeter points Ax', Bx', Cx', Dx', . . . of a two-dimensional color plane Lx' having a lightness level between the two-dimensional color plane Ln' and the two-dimensional color plane Ln-1' according to the two-dimensional color (a', b') of the specific, most-saturated outer perimeter points An', Bn', Cn', Dn', . . . of the two-dimensional color plane Ln' and the two-dimensional color (a', b') of the specific, most-saturated outer perimeter points An-1', Bn-1', Cn-1', Dn-1, . . . of the two-dimensional color plane Ln-1', wherein Ax'=($a_{Ax}'$, $b_{Ax}'$), Bx'=($a_{Bx}'$, $b_{Bx}'$), Cx'=($a_{Cx}'$, $b_{Cx}'$), Dx'=($a_{Dx}'$, $b_{Dx}'$), . . . .

The two-dimensional color (a, b) of the specific, most-saturated outer perimeter points of the two-dimensional color plane Lx having a lightness level between the two-dimensional color plane Ln and the two-dimensional color plane Ln-1 is calculated according to the two-dimensional color (a, b) of the specific, most-saturated outer perimeter points of the two-dimensional color plane Ln and the two-dimensional color (a, b) of the specific, most-saturated outer perimeter points of the color planes Ln-1. And, the two-dimensional color (a', b') of the specific, most-saturated outer perimeter points of the two-dimensional color plane Lx' between the two-dimensional color plane Ln' and the two-dimensional color plane Ln-1' and having the same lightness level as the two-dimensional color plane Lx is calculated according to the two-dimensional color (a', b') of the specific, most-saturated outer perimeter points of the two-dimensional color plane Ln' and the two-dimensional color (a', b') of the specific, most-saturated outer perimeter points of the color planes Ln-1'.

The third conversion matrix module 708 functions to determine a third conversion matrix between the two-dimensional color (a*, b*) of the two-dimensional color plane Lx and the target two-dimensional color (a*', b*') of the two-dimensional color plane Lx' according to the specific, most-saturated outer perimeter points Ax', Bx', Cx', Dx', . . . of the two-dimensional color plane Lx' and the specific, most-saturated outer perimeter points Ax, Bx, Cx, Dx, . . . of the two-dimensional color plane Lx.

The target space color module 709 functions to apply the third conversion matrix to calculate a color-converted and adjusted target color for the color of one point of the original diagram data on the two-dimensional color plane Lx.

The two-dimensional color (a, b) of any one point of the two-dimensional color plane Lx can be converted into the two-dimensional color (a', b') of the point of the target two-dimensional color plane Lx' that corresponds to said one point according to the third conversion matrix, whereby all the two-dimensional color (a', b') of the target two-dimensional color plane Lx' can be determined.

The target data output module 710 functions to output or store target diagram data corresponding to color-converted and adjusted target color.

To be distinguished from the state of the art, the present invention converts the two-dimensional color plane Ln and the two-dimensional color plane Ln-1 of the original diagram data, through a conversion matrix, into the target two-dimensional color plane Ln' and the target two-dimensional color plane Ln-1', calculates a two-dimensional color plane Lx having a lightness level between the two-dimensional color plane Ln and the two-dimensional color plane Ln-1 according to the two-dimensional color plane Ln and the two-dimensional color plane Ln-1, calculates a two-dimensional color plane Lx' between the two-dimensional color plane Ln' and the two-dimensional color plane Ln-1' and having the same lightness level as the two-dimensional color plane Lx according to the two-dimensional color plane Ln' and the two-dimensional color plane Ln-1', calculates a conversion matrix between the two-dimensional color plane Lx and the two-dimensional color plane Lx' according to the two-dimensional color planes Lx and Lx', calculating color-converted and adjusted target color for the color of each point of the original diagram data on the two-dimensional color plane Lx according to the conversion matrix between the two-dimensional color plane Lx and the two-dimensional color plane Lx' and completing color space of the target color. With such a process, it is possible to make conversion of color signal in a CIE Lab color space, adjust hue and color purity of output color, and may also possibly enhance and highlight a preferred color.

Figure 8:
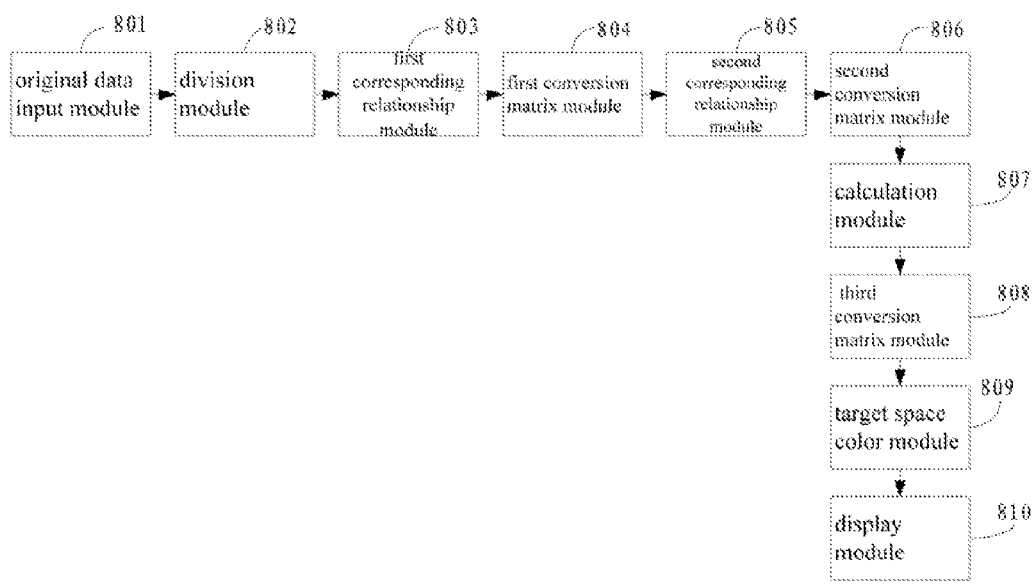
FIG. 8 is schematic view illustrating a liquid crystal display device according to an embodiment of the present invention.

FIG. 8 is schematic view illustrating a liquid crystal display device according to an embodiment of the present invention. As shown in FIG. 8, the device comprises an original data input module 801, a division module 802, a first corresponding relationship module 803, a first conversion matrix module 804, a second corresponding relationship module 805, a second conversion matrix module 806, a calculation module 807, a third conversion matrix module 808, a target space color module 809, and a display module 810.

The original data input module 801 functions for inputting original diagram data of CIE Lab three-dimensional color space. The Lab three-dimensional color space is established on the theory that a color cannot be both blue and yellow at the same time so that a single value can be used to describe characteristics of magenta/green and yellow/blue, wherein L indicates lightness, a indicates magenta/green value, and b indicates yellow/blue value.

The division module 802 functions to equally divide the space in which all the colors corresponding to the original diagram data are located into n two-dimensional color planes of the color space according to lightness so as to form two-dimensional color plan.

The first corresponding relationship module 803 functions to determine specific most saturated points An, Bn, Cn, Dn, . . . of the original diagram data on an outer perimeter of the two-dimensional color plane Ln and determining specific most saturated points An', Bn', Cn', Dn', . . . on an outer perimeter of the target two-dimensional color plane Ln' that is of the same lightness level as the two-dimensional color plane Ln of the original diagram data, wherein the specific most saturated points An', Bn', Cn', Dn', . . . on the outer perimeter of the two-dimensional color plane Ln' and the specific most saturated points An, Bn, Cn, Dn, . . . on the outer perimeter of the two-dimensional color plane Ln form a first one-to-one corresponding relationship.

The first conversion matrix module 804 functions to determine a first conversion matrix according to the first one-to-one corresponding relationship between the specific, most-saturated outer perimeter points An', Bn', Cn', Dn', . . . of the two-dimensional color plane Ln' and the specific, most-saturated outer perimeter points An, Bn, Cn, Dn, . . . of the two-dimensional color plane Ln and converting the two-dimensional color (a, b) of one of the specific, most-saturated outer perimeter points of the two-dimensional color plane Ln into two-dimensional (a', b') of the point of the target two-dimensional color plane Ln' corresponding to said one specific, most-saturated outer perimeter point according to the first conversion matrix.

The second corresponding relationship module 805 functions to determine a second one-to-one corresponding relationship between specific most-saturated points An-1', Bn-1', Cn-1', Dn-1', . . . on outer perimeter of a target two-dimensional color plane Ln-1' and specific most-saturated points of the original diagram data An-1, Bn-1, Cn-1, Dn-1, . . . on outer perimeter of the two-dimensional color plane Ln-1 according to the first one-to-one corresponding relationship.

The second conversion matrix module 806 functions to determine a second conversion matrix according to the second one-to-one corresponding relationship and convert the two-dimensional color (a, b) of one of the specific, most-saturated outer perimeter points of the two-dimensional color plane Ln-1 into the two-dimensional color (a', b') of the point of the target two-dimensional color plane Ln-1' that corresponds to said one specific, most-saturated outer perimeter point according to the second conversion matrix.

The calculation module 807 functions to calculate the two-dimensional color (a, b) of specific, most-saturated outer perimeter points Ax, Bx, Cx, Dx, . . . of a two-dimensional color plane Lx having a lightness level between the two-dimensional color plane Ln and the two-dimensional color plane Ln-1 according to the two-dimensional color (a, b) of the specific, most-saturated outer perimeter points An, Bn, Cn, Dn, . . . of the two-dimensional color plane Ln and the two-dimensional color (a, b) of the specific, most-saturated outer perimeter points An-1, Bn-1, Cn-1, Dn-1, . . . of the two-dimensional color plane Ln-1, wherein $Ax=(a_{Ax}, b_{Ax})$, $Bx=(a_{Bx}, b_{Bx})$, $Cx=(a_{Cx}, b_{Cx})$, $Dx=(a_{Dx}, b_{Dx})$, . . . and calculate the two-dimensional color (a', b') of specific, most-saturated outer perimeter points Ax', Bx', Cx', Dx', . . . of a two-dimensional color plane Lx' having a lightness level between the two-dimensional color plane Ln' and the two-dimensional color plane Ln-1' according to the two-dimensional color (a', b') of the specific, most-saturated outer perimeter points An', Bn', Cn', Dn', of the two-dimensional color plane Ln' and the two-dimensional color (a', b') of the specific, most-saturated outer perimeter points An-1', Bn-1', Cn-1', Dn-1', . . . of the two-dimensional color plane Ln-1', wherein $Ax'=(a_{Ax}', b_{Ax}')$, $Bx'=(a_{Bx}', b_{Bx}')$, $Cx'=(a_{Cx}', b_{Cx}')$, $Dx'=(a_{Dx}', b_{Dx}')$, . . . .

The third conversion matrix module 808 functions to determine a third conversion matrix between the two-dimensional color (a*, b*) of the two-dimensional color plane Lx and the target two-dimensional color (a*', b*') of the two-dimensional color plane Lx' according to the specific, most-saturated outer perimeter points Ax', Bx', Cx', Dx', . . . of the two-dimensional color plane Lx' and the specific, most-saturated outer perimeter points Ax, Bx, Cx, Dx, . . . of the two-dimensional color plane Lx.

The target space color module 809 functions to apply the third conversion matrix to calculate a color-converted and adjusted target color for the color of one point of the original diagram data on the two-dimensional color plane Lx.

The display module 810 functions to make displaying of target diagram data according to color-converted and adjusted target color.

To be distinguished from the state of the art, the present invention converts the two-dimensional color plane Ln and the two-dimensional color plane Ln-1 of the original diagram data, through a conversion matrix, into the target two-dimensional color plane Ln' and the target two-dimensional color plane Ln-1', calculates a two-dimensional color plane Lx between the two-dimensional color plane Ln and the two-dimensional color plane Ln-1 according to the two-dimensional color plane Ln and the two-dimensional color plane Ln-1, calculates a two-dimensional color plane Lx' between the two-dimensional color plane Ln' and the two-dimensional color plane Ln-1' and having the same lightness level as the two-dimensional color plane Lx according to the two-dimensional color plane Ln' and the two-dimensional color plane Ln-1', calculates a conversion matrix between the two-dimensional color plane Lx and the two-dimensional color plane Lx' according to the two-dimensional color planes Lx and Lx', calculating color-converted and adjusted target color for the color of each point of the original diagram data on the two-dimensional color plane Lx according to the conversion matrix between the two-dimensional color plane Lx and the two-dimensional color plane Lx' and completing color space of the target color. With such a process, it is possible to make conversion of color signal in a CIE Lab color space, adjust hue and color purity of output color, and may also possibly enhance and highlight a preferred color.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the clams of the present invention.

What is claimed is:

1. A CIE Lab color space based color conversion method, characterized by comprising:
inputting original diagram data based on CIE Lab three-dimensional color space;

equally dividing the space in which all the colors corresponding to the original diagram data are located into n two-dimensional color planes of the color space according to lightness so as to form n two-dimensional color planes L1, L2, L3, . . . , Ln-1, and Ln, where n is a nature number;

determining specific most saturated points An, Bn, Cn, Dn, . . . of the original diagram data on an outer perimeter of the two-dimensional color plane Ln and determining specific most saturated points An', Bn', Cn', Dn', . . . on an outer perimeter of the target two-dimensional color plane Ln' that is of the same lightness level as the two-dimensional color plane Ln of the original diagram data, wherein the specific most saturated points An', Bn', Cn', Dn', . . . on the outer perimeter of the two-dimensional color plane Ln' and the specific most saturated points An, Bn, Cn, Dn, . . . on the outer perimeter of the two-dimensional color plane Ln form a first one-to-one corresponding relationship;

determining a first conversion matrix according to the first one-to-one corresponding relationship between the specific, most-saturated outer perimeter points An', Bn', Cn', Dn', . . . of the two-dimensional color plane Ln' and the specific, most-saturated outer perimeter points An, Bn, Cn, Dn, . . . of the two-dimensional color plane Ln and converting the two-dimensional color (a, b) of one of the specific, most-saturated outer perimeter points of the two-dimensional color plane Ln into two-dimensional (a', b') of the point of the target two-dimensional color plane Ln' corresponding to said one specific, most-saturated outer perimeter point according to the first conversion matrix;

determining a second one-to-one corresponding relationship between specific most-saturated points An-1', Bn-1', Cn-1', Dn-1', . . . on outer perimeter of a target two-dimensional color plane Ln-1' and specific most-saturated points of the original diagram data An-1, Bn-1, Cn-1, Dn-1, . . . on outer perimeter of the two-dimensional color plane Ln-1 according to the first one-to-one corresponding relationship, determining a second conversion matrix according to the second one-to-one corresponding relationship, and converting the two-dimensional color (a, b) of one of the specific, most-saturated outer perimeter points of the two-dimensional color plane Ln-1 into the two-dimensional color (a', b') of the point of the target two-dimensional color plane Ln-1' that corresponds to said one specific, most-saturated outer perimeter point according to the second conversion matrix;

calculating the two-dimensional color (a, b) of specific, most-saturated outer perimeter points Ax, Bx, Cx, Dx, . . . of a two-dimensional color plane Lx having a lightness level between the two-dimensional color plane Ln and the two-dimensional color plane Ln-1 according to the two-dimensional color (a, b) of the specific, most-saturated outer perimeter points An, Bn, Cn, Dn, . . . of the two-dimensional color plane Ln and the two-dimensional color (a, b) of the specific, most-saturated outer perimeter points An-1, Bn-1, Cn-1, Dn-1, . . . of the two-dimensional color plane Ln-1, wherein Ax=($a_{Ax}$, $b_{Ax}$), Bx=($a_{Bx}$, $b_{Bx}$), Cx=($a_{Cx}$, $b_{Cx}$), Dx=($a_{Dx}$, $b_{Dx}$), . . . and calculating the two-dimensional color (a', b') of specific, most-saturated outer perimeter points Ax', Bx', Cx', Dx', . . . of a two-dimensional color plane Lx' having a lightness level between the two-dimensional color plane Ln' and the two-dimensional color plane Ln-1' according to the two-dimensional color (a', b') of the specific, most-saturated outer perimeter points An', Bn', Cn', Dn', . . . of the two-dimensional color plane Ln' and the two-dimensional color (a', b') of the specific, most-saturated outer perimeter points An-1', Bn-1', Cn-1', Dn-1', . . . of the two-dimensional color plane Ln-1', wherein Ax'=($a_{Ax}'$, $b_{Ax}'$), Bx'=($a_{Bx}'$, $b_{Bx}'$), Cx'=($a_{Cx}'$, $b_{Cx}'$), Dx'=($a_{Dx}'$, $b_{Dx}'$), . . . ;

determining a third conversion matrix between the two-dimensional color (a*, b*) of the two-dimensional color plane Lx and the target two-dimensional color (a*', b*') of the two-dimensional color plane Lx' according to the specific, most-saturated outer perimeter points Ax', Bx', Cx', Dx', . . . of the two-dimensional color plane Lx' and the specific, most-saturated outer perimeter points Ax, Bx, Cx, Dx, . . . of the two-dimensional color plane Lx;

applying the third conversion matrix to calculate a color-converted and adjusted target color for the color of one point of the original diagram data on the two-dimensional color plane Lx; and outputting or storing target diagram data corresponding to color-converted and adjusted target color.

2. The method as claimed in claim 1, characterized in that the first conversion matrix is:

$$\begin{bmatrix} a'_n \\ b'_n \end{bmatrix} = \begin{bmatrix} a11 & a12 & a13 & a14 & a15 & a16 & a17 & a18 & a19 & a20 \\ a21 & a22 & a23 & a24 & a25 & a26 & a27 & a28 & a29 & a30 \end{bmatrix} \times \begin{bmatrix} a_n^3 \\ b_n^3 \\ a_n^2 b_n \\ a_n b_n^2 \\ a_n^2 \\ b_n^2 \\ a_n b_n \\ a_n \\ b_n \\ 1 \end{bmatrix}.$$

3. The method as claimed in claim 1, characterized in that the second conversion matrix is:

$$\begin{bmatrix} a'_{n-1} \\ b'_{n-1} \end{bmatrix} = \begin{bmatrix} a11 & a12 & a13 & a14 & a15 & a16 & a17 & a18 & a19 & a20 \\ a21 & a22 & a23 & a24 & a25 & a26 & a27 & a28 & a29 & a30 \end{bmatrix} \times \begin{bmatrix} a_{n-1}^3 \\ b_{n-1}^3 \\ a_{n-1}^2 b_{n-1} \\ a_{n-1} b_{n-1}^2 \\ a_{n-1}^2 \\ b_{n-1}^2 \\ a_{n-1} b_{n-1} \\ a_{n-1} \\ b_{n-1} \\ 1 \end{bmatrix}.$$

4. The method as claimed in claim 1, characterized in that the step of calculating the two-dimensional color (a, b) of specific, most-saturated outer perimeter points Ax, Bx, Cx, Dx, . . . of a two-dimensional color plane Lx having a lightness level between the two-dimensional color plane Ln and the two-dimensional color plane Ln-1 according to the two-dimensional color (a, b) of the specific, most-saturated outer perimeter points An, Bn, Cn, Dn, . . . of the two-dimensional color plane Ln and the two-dimensional color (a, b) of the specific, most-saturated outer perimeter points An-1, Bn-1, Cn-1, Dn-1, . . . of the two-dimensional color plane Ln-1, wherein Ax=($a_{Ax}$, $b_{Ax}$), Bx=($a_{Bx}$, $b_{Bx}$), Cx=($a_{Cx}$, $b_{Cx}$), Dx=($a_{Dx}$, $b_{Dx}$), . . . , comprises carrying out the calculation according to first relationships between the specific, most-saturated outer perimeter points Ax, Bx, Cx, Dx, . . . of the two-dimensional color plane Lx having a lightness level between the two-dimensional color plane Ln and the two-dimensional color plane Ln-1 and the specific, most-saturated outer perimeter points An, Bn, Cn, Dn, . . . of the two-dimensional color plane Ln and the specific, most-saturated outer perimeter points An-1, Bn-1, Cn-1, Dn-1, . . . of the two-dimensional color plane Ln-1 in order to obtain the two-dimensional color (a, b) of the specific, most-saturated outer perimeter points Ax, Bx, Cx, Dx, . . . of the two-dimensional color plane Lx having a lightness level between the two-dimensional color plane Ln and the two-dimensional color plane Ln-1, wherein the first relationships are as follows:

$$a_x = a_n + (L_x - L_n) * (a_{n-1} - a_n)/(L_{n-1} - L_n)$$

$$b_x = b_n + (L_x - L_n) * (b_{n-1} - b_n)/(L_{n-1} - L_n).$$

5. The method as claimed in claim 1, characterized in that the step of calculating the two-dimensional color (a', b') of specific, most-saturated outer perimeter points Ax', Bx', Cx', Dx', . . . of a two-dimensional color plane Lx' between the two-dimensional color plane Ln' and the two-dimensional color plane Ln-1' and having the same lightness level as the two-dimensional color plane Lx according to the two-dimensional color (a', b') of the specific, most-saturated outer perimeter points An', Bn', Cn', Dn', . . . of the two-dimensional color plane Ln' and the two-dimensional color (a', b') of the specific, most-saturated outer perimeter points An-1', Bn-1', Cn-1', Dn-1', . . . of the two-dimensional color plane Ln-1', wherein Ax'=($a_{Ax}'$, $b_{Ax}'$), Bx'=($a_{Bx}'$, $b_{Bx}'$), Cx'=($a_{Cx}'$, $b_{Cx}'$), Dx'=($a_{Dx}'$, $b_{Dx}'$), . . . ; comprises carrying out the calculation according to second relationships between the specific, most-saturated outer perimeter points Ax', Bx', Cx', Dx', . . . of the two-dimensional color plane Lx' and the specific, most-saturated outer perimeter points An', Bn', Cn', Dn', . . . of the two-dimensional color plane Ln' and the specific, most-saturated outer perimeter points An-1', Bn-1', Cn-1', Dn-1', . . . of the two-dimensional color plane Ln-1' in order to obtain the two-dimensional color (a', b') of the specific, most-saturated outer perimeter points Ax', Bx', Cx', Dx', . . . of the two-dimensional color plane Lx' between the two-dimensional color plane Ln' and the color planes Ln-1' and having the same lightness level as two-dimensional color plane Lx, wherein the second relationships are as follows:

$$a_x' = a_n' + (L_x - L_n) * (a_{n-1}' - a_n')/(L_{n-1} - L_n)$$

$$b_x' = b_n' + (L_x - L_n) * (b_{n-1}' - b_n')/(L_{n-1} - L_n).$$

6. The method as claimed in claim 1, characterized in that the third conversion matrix between the two-dimensional color (a*, b*) of the two-dimensional color plane Lx and the target two-dimensional color (a*', b*') of the two-dimensional color plane Lx' is:

$$\begin{bmatrix} a_x' \\ b_x' \end{bmatrix} = \begin{bmatrix} a11 & a12 & a13 & a14 & a15 & a16 & a17 & a18 & a19 & a20 \\ a21 & a22 & a23 & a24 & a25 & a26 & a27 & a28 & a29 & a30 \end{bmatrix} \times \begin{bmatrix} a_x^3 \\ b_x^3 \\ a_x^2 b_x \\ a_x b_x^2 \\ a_x^2 \\ b_x^2 \\ a_x b_x \\ a_{x-1} \\ b_{x-1} \\ 1 \end{bmatrix}.$$

7. The method as claimed in claim 1, characterized in that before the step of equally dividing the space in which all the colors corresponding to the original diagram data are located into n two-dimensional color planes of the color space, a step of determining the number n of the two-dimensional color planes that are formed by equally dividing, according to lightness, the space to which all the colors of the original diagram data corresponds on the basis of proportional relationship between preciseness of color conversion and the number of divisions made on the color space is further included.

8. The method as claimed in claim 1, characterized in that before the step of determining specific most saturated points An, Bn, Cn, Dn, . . . of the original diagram data on an outer perimeter of the two-dimensional color plane Ln and determining specific most saturated points An', Bn', Cn', Dn', . . . on an outer perimeter of the target two-dimensional color plane Ln' that is of the same lightness level as the two-dimensional color plane Ln of the original diagram data, a step of determining the number of the specific, most-saturated outer perimeter points of the two-dimensional color plane on the basis of proportional relationship between preciseness of color conversion and the number of the specific most-saturated outer perimeter points of the two-dimensional color plane is further included.

9. A CIE Lab color space based color conversion device, characterized in that the device comprises:
an original data input module, which functions for inputting original diagram data based on CIE Lab three-dimensional color space;
a division module, which functions to equally divide the space in which all the colors corresponding to the original diagram data are located into n two-dimensional color planes of the color space according to lightness so as to form n two-dimensional color planes L1, L2, L3, . . . , Ln-1, and Ln, where n is a nature number;
a first corresponding relationship module, which functions to determine specific most saturated points An, Bn, Cn, Dn, . . . of the original diagram data on an outer perimeter of the two-dimensional color plane Ln and determining specific most saturated points An', Bn', Cn', Dn', . . . on an outer perimeter of the target two-dimensional color plane Ln' that is of the same lightness level as the two-dimensional color plane Ln of the original diagram data, wherein the specific most saturated points An', Bn', Cn', Dn', . . . on the outer perimeter of the two-dimensional color plane Ln' and the specific most saturated points An, Bn, Cn, Dn, . . . on the outer perimeter of the two-dimensional color plane Ln form a first one-to-one corresponding relationship;

a first conversion matrix module, which functions to determine a first conversion matrix according to the first one-to-one corresponding relationship between the specific, most-saturated outer perimeter points An', Bn', Cn', Dn', . . . of the two-dimensional color plane Ln' and the specific, most-saturated outer perimeter points An, Bn, Cn, Dn, . . . of the two-dimensional color plane Ln and converting the two-dimensional color (a, b) of one of the specific, most-saturated outer perimeter points of the two-dimensional color plane Ln into two-dimensional (a', b') of the point of the target two-dimensional color plane Ln' corresponding to said one specific, most-saturated outer perimeter point according to the first conversion matrix;

a second corresponding relationship module, which functions to determine a second one-to-one corresponding relationship between specific most-saturated points An-1', Bn-1', Cn-1', Dn-1', . . . on outer perimeter of a target two-dimensional color plane Ln-1' and specific most-saturated points of the original diagram data An-1, Bn-1, Cn-1, Dn-1, . . . on outer perimeter of the two-dimensional color plane Ln-1 according to the first one-to-one corresponding relationship;

a second conversion matrix module, which functions to determine a second conversion matrix according to the second one-to-one corresponding relationship and convert the two-dimensional color (a, b) of one of the specific, most-saturated outer perimeter points of the two-dimensional color plane Ln-1 into the two-dimensional color (a', b') of the point of the target two-dimensional color plane Ln-1' that corresponds to said one specific, most-saturated outer perimeter point according to the second conversion matrix;

a calculation module, which functions to calculate the two-dimensional color (a, b) of specific, most-saturated outer perimeter points Ax, Bx, Cx, Dx, . . . of a two-dimensional color plane Lx having a lightness level between the two-dimensional color plane Ln and the two-dimensional color plane Ln-1 according to the two-dimensional color (a, b) of the specific, most-saturated outer perimeter points An, Bn, Cn, Dn, . . . of the two-dimensional color plane Ln and the two-dimensional color (a, b) of the specific, most-saturated outer perimeter points An-1, Bn-1, Cn-1, Dn-1, . . . of the two-dimensional color plane Ln-1, wherein Ax=($a_{Ax}$, $b_{Ax}$), Bx=($a_{Bx}$, $b_{Bx}$), Cx=($a_{Cx}$, $b_{Cx}$), Dx=($a_{Dx}$, $b_{Dx}$), . . . and calculate the two-dimensional color (a', b') of specific, most-saturated outer perimeter points Ax', Bx', Cx', Dx', . . . of a two-dimensional color plane Lx' having a lightness level between the two-dimensional color plane Ln' and the two-dimensional color plane Ln-1' according to the two-dimensional color (a', b') of the specific, most-saturated outer perimeter points An', Bn', Cn', Dn', . . . of the two-dimensional color plane Ln' and the two-dimensional color (a', b') of the specific, most-saturated outer perimeter points An-1', Bn-1', Cn-1', Dn-1', . . . of the two-dimensional color plane Ln-1', wherein Ax'=($a_{Ax}'$, $b_{Ax}'$), Bx'=($a_{Bx}'$, $b_{Bx}'$), Cx'=($a_{Cx}'$, $b_{Cx}'$), Dx'=($a_{Dx}'$, $b_{Dx}'$), . . . ;

a third conversion matrix module, which functions to determine a third conversion matrix between the two-dimensional color (a*, b*) of the two-dimensional color plane Lx and the target two-dimensional color (a*', b*') of the two-dimensional color plane Lx' according to the specific, most-saturated outer perimeter points Ax', Bx', Cx', Dx', . . . of the two-dimensional color plane Lx' and the specific, most-saturated outer perimeter points Ax, Bx, Cx, Dx, . . . of the two-dimensional color plane Lx;

a target space color module, which functions to apply the third conversion matrix to calculate a color-converted and adjusted target color for the color of one point of the original diagram data on the two-dimensional color plane Lx; and a target data output module, which functions to output or store target diagram data corresponding to color-converted and adjusted target color.

10. A liquid crystal display device, characterized in that the device comprises:

an original data input module, which functions for inputting original diagram data based on CIE Lab three-dimensional color space;

a division module, which functions to equally divide the space in which all the colors corresponding to the original diagram data are located into n two-dimensional color planes of the color space according to lightness so as to form n two-dimensional color planes L1, L2, L3, . . . , Ln-1, and Ln, where n is a nature number;

a first corresponding relationship module, which functions to determine specific most saturated points An, Bn, Cn, Dn, . . . of the original diagram data on an outer perimeter of the two-dimensional color plane Ln and determining specific most saturated points An', Bn', Cn', Dn', . . . on an outer perimeter of the target two-dimensional color plane Ln' that is of the same lightness level as the two-dimensional color plane Ln of the original diagram data, wherein the specific most saturated points An', Bn', Cn', Dn', . . . on the outer perimeter of the two-dimensional color plane Ln' and the specific most saturated points An, Bn, Cn, Dn, . . . on the outer perimeter of the two-dimensional color plane Ln form a first one-to-one corresponding relationship;

a first conversion matrix module, which functions to determine a first conversion matrix according to the first one-to-one corresponding relationship between the specific, most-saturated outer perimeter points An', Bn', Cn', Dn', . . . of the two-dimensional color plane Ln' and the specific, most-saturated outer perimeter points An, Bn, Cn, Dn, . . . of the two-dimensional color plane Ln and converting the two-dimensional color (a, b) of one of the specific, most-saturated outer perimeter points of the two-dimensional color plane Ln into two-dimensional (a', b') of the point of the target two-dimensional color plane Ln' corresponding to said one specific, most-saturated outer perimeter point according to the first conversion matrix;

a second corresponding relationship module, which functions to determine a second one-to-one corresponding relationship between specific most-saturated points An-1', Bn-1', Cn-1', Dn-1', . . . on outer perimeter of a target two-dimensional color plane Ln-1' and specific most-saturated points of the original diagram data An-1, Bn-1, Cn-1, Dn-1, . . . on outer perimeter of the two-dimensional color plane Ln-1 according to the first one-to-one corresponding relationship;

a second conversion matrix module, which functions to determine a second conversion matrix according to the second one-to-one corresponding relationship and convert the two-dimensional color (a, b) of one of the specific, most-saturated outer perimeter points of the two-dimensional color plane Ln-1 into the two-dimensional color (a', b') of the point of the target two-dimensional color plane Ln-1' that corresponds to said one specific, most-saturated outer perimeter point according to the second conversion matrix;

a calculation module, which functions to calculate the two-dimensional color (a, b) of specific, most-saturated outer perimeter points Ax, Bx, Cx, Dx, . . . of a two-dimensional color plane Lx having a lightness level between the two-dimensional color plane Ln and the two-dimensional color plane Ln-1 according to the two-dimensional color (a, b) of the specific, most-saturated outer perimeter points An, Bn, Cn, Dn, . . . of the two-dimensional color plane Ln and the two-dimensional color (a, b) of the specific, most-saturated outer perimeter points An-1, Bn-1, Cn-1, Dn-1, . . . of the two-dimensional color plane Ln-1, wherein Ax=$(a_{Ax}, b_{Ax})$, Bx=$(a_{Bx}, b_{Bx})$, Cx=$(a_{Cx}, b_{Cx})$, Dx=$(a_{Dx}, b_{Dx})$, . . . and calculate the two-dimensional color (a', b') of specific, most-saturated outer perimeter points Ax', Bx', Cx', Dx', . . . of a two-dimensional color plane Lx' having a lightness level between the two-dimensional color plane Ln' and the two-dimensional color plane Ln-1' according to the two-dimensional color (a', b') of the specific, most-saturated outer perimeter points An', Bn', Cn', Dn', . . . of the two-dimensional color plane Ln' and the two-dimensional color (a', b') of the specific, most-saturated outer perimeter points An-1', Bn-1', Cn-1', Dn-1', . . . of the two-dimensional color plane Ln-1', wherein Ax'=$(a_{Ax}', b_{Ax}')$, Bx'=$(a_{Bx}', b_{Bx}')$, Cx'=$(a_{Cx}', b_{Cx}')$, Dx'=$(a_{Dx}', b_{Dx}')$, . . . ;

a third conversion matrix module, which functions to determine a third conversion matrix between the two-dimensional color (a*, b*) of the two-dimensional color plane Lx and the target two-dimensional color (a*', b*') of the two-dimensional color plane Lx' according to the specific, most-saturated outer perimeter points Ax', Bx', Cx', Dx', . . . of the two-dimensional color plane Lx' and the specific, most-saturated outer perimeter points Ax, Bx, Cx, Dx, . . . of the two-dimensional color plane Lx;

a target space color module, which functions to apply the third conversion matrix to calculate a color-converted and adjusted target color for the color of one point of the original diagram data on the two-dimensional color plane Lx; and a display module, which functions to make displaying of target diagram data according to color-converted and adjusted target color.

\* \* \* \* \*